(12) United States Patent
Murakami

(10) Patent No.: US 7,535,803 B2
(45) Date of Patent: May 19, 2009

(54) METHOD FOR RECORDING TO AND REPRODUCING FROM A MAGNETIC RECORDING MEDIUM, RECORDING AND REPRODUCTION DEVICE FOR THE SAME, AND MAGNETIC RECORDING MEDIUM

(75) Inventor: Motoyoshi Murakami, Hirakata (JP)

(73) Assignee: Panasonic Corporation, Osaka (JP)

( * ) Notice: Subject to any disclaimer, the term of this patent is extended or adjusted under 35 U.S.C. 154(b) by 554 days.

(21) Appl. No.: 11/193,489

(22) Filed: Aug. 1, 2005

(65) Prior Publication Data

US 2006/0024529 A1  Feb. 2, 2006

(30) Foreign Application Priority Data

Aug. 2, 2004  (JP)  ............................. 2004-225346

(51) Int. Cl.
*G11B 11/00*  (2006.01)
(52) U.S. Cl. ............... 369/13.08; 369/13.07; 369/13.42
(58) Field of Classification Search ............... 369/13.05, 369/13.07, 13.46, 13.59, 13.56, 13.42, 13.47, 369/13.28, 13.41, 126, 13.08; 428/810
See application file for complete search history.

(56) References Cited

U.S. PATENT DOCUMENTS

| | | | |
|---|---|---|---|
| 5,656,385 A | 8/1997 | Nakajima et al. | |
| 6,027,825 A | 2/2000 | Shiratori et al. | |
| 6,143,436 A | 11/2000 | Nakajima et al. | |
| 6,399,174 B1 | 6/2002 | Shiratori et al. | |
| 6,403,148 B1 | 6/2002 | Shiratori et al. | |
| 6,430,115 B1 * | 8/2002 | Hirokane et al. | 369/13.43 |
| 6,519,211 B1 * | 2/2003 | Murakami et al. | 369/13.08 |
| 6,603,619 B1 | 8/2003 | Kojima et al. | |
| 6,788,624 B2 * | 9/2004 | Murakami et al. | 369/13.08 |

FOREIGN PATENT DOCUMENTS

| | | |
|---|---|---|
| EP | 0 471 527 | 2/1992 |
| EP | 0 618 572 | 10/1994 |
| EP | 1 020 854 | 7/2000 |
| EP | 1 158 509 | 11/2001 |
| EP | 1 426 944 | 6/2004 |
| JP | 4-176034 | 6/1992 |
| JP | 6-290496 | 10/1994 |
| JP | 2000-207722 | 7/2000 |

* cited by examiner

*Primary Examiner*—Ali Neyzari
(74) *Attorney, Agent, or Firm*—Wenderoth, Lind & Ponack, L.L.P.

(57) ABSTRACT

A method for recording to and reproducing from a magnetic recording medium is disclosed in which an information signal is recorded and reproduced under thermal assist, and which allows one to stably record tiny recording magnetic domains and stably detect a reproduction output signal during reproduction when recording at high density. In this method, the temperature distribution in the information recording and reproduction region of the magnetic recording medium is controlled to be different during recording and during reproduction. This allows recording magnetic domains to be stabilized even when recording fine marks, and greatly increases the recording density because stable detection is possible without reducing the reproduction signal amplitude.

22 Claims, 8 Drawing Sheets

METHOD FOR RECORDING TO AND REPRODUCING FROM A MAGNETIC RECORDING MEDIUM, RECORDING AND REPRODUCTION DEVICE FOR THE SAME, AND MAGNETIC RECORDING MEDIUM

TECHNICAL FIELD

The present invention relates to a method for recording to and reproducing from a rewritable magnetic recording medium, to a recording and reproduction device for the same, and to a magnetic recording medium. Particularly, the present invention relates to a method for recording to and reproducing from a rewritable magnetic recording medium, to a recording and reproduction device for the same, and to a magnetic recording medium that are based on a thermally-assisted recording and reproduction method.

BACKGROUND ART

Optical recording media, such as magneto-optical recording media or phase change recording media, are portable recording media that allow large amounts of data to be recorded at high density, and the growth of multimedia applications in recent years has been accompanied by rapidly increasing demand for media capable of recording large computer files or video files.

Optical recording media generally consist of a multilayer film including a recording layer formed on a plastic or other transparent, disk-shaped substrate. Information is recorded to or deleted from these optical recording media by irradiating the medium with a laser using a focus servo and guide grooves, or using pre-pits while a tracking servo is employed, and signals are reproduced by using the reflected laser light.

The most common type of magnetic recording medium used to involve so-called light modulation recording, in which erasure was performed by adding a stationary magnetic field, after which recording was performed by adding a stationary magnetic field in the opposite direction, but a magnetic field modulation approach, in which laser light is applied while the magnetic field is modulated according to a recording pattern, has been put in to practical use as a method that allows recording in a single rotation (direct overwrite) and also affords accurate recording even at high recording densities at high speed. Phase change recording media have also been commercialized because direct overwriting is possible with light modulation recording, and reproduction is possible with the same optical system as with a CD or DVD.

The limit to recording density with an optical recording medium is a function of the diffraction limit ($\approx \lambda/2NA$; where NA is the numeric aperture of the objective lens) determined by the laser wavelength ($\lambda$) of the light source. More recently, a system has been proposed in which an NA of 0.8 or higher is obtained by using a pair of objective lenses, and much development has gone into this system. The laser used for recording and reproduction has conventionally irradiated the recording film through the substrate, but the larger the NA, the greater is the astigmatism produced by substrate tilt as the light passes through the substrate, for example, so the substrate must be made thin. In this case, for example, the substrate having thickness of 0.5 mm or less cannot be held during a manufacturing process of a medium, so a method in which information is recorded and reproduced through a protective layer (or a protective sheet) on the thin film is proposed.

Also, as recording density has risen in the field of magnetic recording, MR (magneto-resistive) heads that make use of a magnetic resistance effect have become the most common type of reproduction head, and more recently GMR (giant magneto-resistive) heads that afford higher magnetic field sensitivity have come onto the market. In addition, TMR (tunnel magneto-resistive) heads that give even higher magnetic field sensitivity have been developed. Thus, higher recording density has been achieved with magnetic recording media than with optical recording media as a result of improvements to the medium and the development of practical GMR heads, TMR heads and so forth, but for even higher densities to be attained with magnetic recording media, it is essential that there are improvements such as techniques for increasing the density on a recording film, thermal stability, heat-stability and to disk head interface technology.

A technique for achieving high density recording by the fusion of optical technology with magnetic recording and reproduction technology has also been developed. For instance, a ferrimagnetic recording medium and a thermally-assisted magnetic recording and reproduction system that makes use of a laser beam and this magnetic recording medium have been developed (see Japanese Patent 2,617,025, for example).

With a thermally-assisted magnetic recording and reproduction system such as this, the temperature of the magnetic recording medium is raised by the laser beam during recording, which lowers the coercive force of the recording region, and in this state an external magnetic field is applied with a recording-use magnetic head so that information is recorded in the recording region. During reproduction as well, the temperature of the magnetic recording medium is raised by the laser beam, which increases the strength of residual magnetization in the recording region, and information is reproduced by using a reproduction-use magnetic head (such as a GMR) to detect the magnetic flux from this residual magnetization. The result is the high density magnetic recording and reproduction and information.

Furthermore, with a magneto-optical recording medium, a technique in which the apparent reproduction signal is increased by domain wall movement has been proposed (see Japanese Laid-Open Patent Application H6-290496, for example), but there were problems in terms of the high density recording of fine recording magnetic domains on a recording film.

Furthermore, in the case of magnetic recording, smaller recording domains and higher density have made the thermal stability of the recording magnetic domain a matter of great import, so the stability of the recording magnetic domain, and reliability as an information storage medium must be ensured.

However, when magnetic recording and reproduction with higher density was performed with the conventional magnetic recording media discussed above, a problem of thermal stability in the recording magnetic domain had to be considered.

In order to stabilize recording magnetic domains, it is necessary to increase the magnetic anisotropy of a magnetic recording medium and raise the coercive force at room temperature, but this requires either the use of a magnetic head that applies a large recording magnetic field, or the use of a thermal assist or the like to raise the temperature and recording with a magnetic head.

However, with a magnetic head that applies a large recording magnetic field, the head becomes larger, so it is more difficult to control the amount of lift, to achieve a high transfer rate, and so forth, and in high density recording other problems are encountered as a result of magnetic field leakage to the surroundings.

Also, with a thermally-assisted magnetic recording and reproduction system, the temperature gradient in the recording film and stray magnetic field cause domain wall movement in the recorded magnetic domains, making it difficult to record fine marks.

Particularly, alloys of rare earth metal-transition metal-based materials can raise the coercive force at room temperature. However, the alloys are amorphous, so movement of the magnetic domain wall resulted in instability and disappearance of the magnetic domain of the tiny recording marks.

Furthermore, regardless of the method, the problems are that it is difficult to ensure sufficient long-term reliability for an information storage medium, and stability is poor in high density recording as a result of smaller recording marks.

Also, with using a reproduction head with high reproduction output sensitivity, such as a GMR head or TMR head, there is the problem that an adequate detection signal will not be obtained if the recording mark is too fine. Furthermore, to reduce interference between adjacent marks, the spacing (flying height) between the magnetic head and the recording medium has to be small, and the head-disk gap must be controlled to the order of just a few nanometers or less.

It is an object of the present invention to provide a method for recording to and reproducing from a magnetic recording medium, a magnetic recording medium, and a recording and reproduction device for the same, with which the stability of fine recording marks can be increased and signal characteristics will be excellent, even when recording at high density in magnetic recording and reproduction using thermal assist. This invention addresses this object as well as other objects, which will become apparent to those skilled in the art from this disclosure.

SUMMARY OF THE INVENTION

The present invention is a method for recording to and reproducing from a magnetic recording medium, in which an information signal is recorded and reproduced while the temperature of the magnetic recording medium is raised by a heating method for raising the temperature of a magnetic recording medium, wherein the temperature distribution in the signal recording and reproduction region of the magnetic recording medium is controlled to be different during recording and during reproduction of the information signal.

As a result, even when recording and reproducing at high density, stable recording magnetic domains can be formed, the stability of fine recording marks can be increased, and excellent reproduction signal characteristics can be achieved.

The heating method is characterized by being controlled such that the maximum heating temperature will be different during recording and during reproduction of the information signal.

Preferably, the heating method is irradiating the magnetic recording medium with light.

Preferably, the heating method is controlled such that light sources of different wavelength will be selected during recording and during reproduction of the information signal.

Preferably, the heating method is controlled such that light sources of different numerical aperture will be selected during recording and during reproduction of the information signal.

Preferably, the heating method is controlled such that an exit position of light will be different during recording and during reproduction of the information signal.

Preferably, the heating method is controlled such that a spot diameter of outgoing light will be different during recording and during reproduction of the information signal.

The heating method is characterized by performing irradiation by emitting light from a light source through a waveguide.

Preferably, the heating method performs irradiation by emitting light from a light source using a recording waveguide and a reproduction waveguide during recording and during reproduction of an information signal, respectively.

The present invention is characterized in that the diameter of the waveguide during optical irradiation is different in the recording waveguide and in the reproduction waveguide.

Preferably, the optical constants of the waveguide material are different in the recording waveguide and the reproduction waveguide.

The heating method may irradiate with pulses of light during recording or reproduction of the information signal.

Preferably, the width of the light pulses is controlled to be different during recording and during reproduction.

Preferably, the light emission timing is controlled so as to shift the phase with a recording mark edge during the emission of the light pulses.

Preferably, the linear velocity of the magnetic recording medium is controlled to be different during recording and during reproduction of the information signal.

The recording and reproduction method of the present invention is characterized in that a temperature distribution gradient produced by the heating method in a recording film is utilized during recording and during reproduction of the information signal.

Here, the temperature distribution gradient is operated by the heating method.

The present invention is characterized in that the center of a magnetic head is within the temperature distribution gradient of the recording film during recording and during reproduction of the information signal.

Preferably, the temperature distribution gradient of the recording film near the magnetic head is controlled to be greater during the reproduction of the information signal than during its recording.

Preferably, the position of maximum temperature distribution in the recording film is controlled to be different from the position of the magnetic head during reproduction of the information signal.

Preferably, the position of maximum temperature distribution in the recording film is controlled to be near the position of the magnetic head during recording of the information signal.

Preferably, the position of maximum temperature distribution in the recording film is controlled during the recording of an information signal so as to be in the center of the magnetic flux generated from the magnetic head.

Preferably, the temperature distribution gradient near the position of a magnetic recording head during the recording of an information signal is controlled to be less than the temperature distribution gradient near the position of a magnetic reproduction head.

The present invention is characterized in that the magnetic recording medium comprises at least a recording layer and a reproduction layer, and the reproduction signal is detected from domain wall movement in the reproduction layer.

The recording and reproduction device of the present invention is characterized by comprising a heating unit for raising the temperature of a magnetic recording medium, a magnetic head for magnetically recording and reproducing a signal to and from the magnetic recording medium, and a control unit for controlling the recording and reproduction of an information signal, wherein the control unit performs the recording and reproduction of the information signal while the temperature of the magnetic recording medium is raised by the heating unit, and controls the temperature distribution in the signal recording and reproduction region of the magnetic recording medium so as to be different during the recording and during the reproduction of the information signal.

Preferably, the heating unit raises the temperature of the magnetic recording medium on the basis of recording information stored on the magnetic recording medium, and the control unit controls the linear velocity of the magnetic recording medium so as to be different during the recording and during the reproduction of the information signal.

As a result, even when recording and reproducing at high density, stable recording magnetic domains can be formed, the stability of fine recording marks can be increased, and excellent reproduction signal characteristics can be achieved.

The present invention is a thermally-assisted recording and reproduction type of magnetic recording medium that performs the recording and reproduction of an information signal magnetically, having at least a recording layer and a reproduction layer, wherein the information signal recorded in the recording layer is transferred to the reproduction layer, the transfer magnetic domain transferred to the reproduction layer is expanded by domain wall movement in the reproduction layer, and the absorption coefficient of the recording layer and/or the reproduction layer varies with the wavelength of the irradiating light.

As a result, even when recording and reproducing at high density, stable recording magnetic domains can be formed, the stability of fine recording marks can be increased, and excellent reproduction signal characteristics can be achieved.

Preferably, an interference layer whose absorption coefficient varies with the wavelength of the irradiating light is provided on the optically irradiated side of the magnetic recording medium.

Preferably, a thermal absorption layer whose absorption coefficient varies with the wavelength of the irradiating light is provided near the recording layer of the magnetic recording medium.

Preferably, the coefficient of thermal conductivity varies from the recording track (on-track) to an intermediate region of the recording tracks.

According to the present invention, it is possible to provide a magnetic recording medium with which stable recording and reproduction characteristics are obtained and signal characteristics are excellent, even when rewriting is repeatedly performed at high speed and in high density recording, as well as a method for recording to and reproducing from this medium, and a recording and reproduction device for this medium.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure.

DETAILED DESCRIPTION OF THE INVENTION

Embodiment 1

Figure 1:
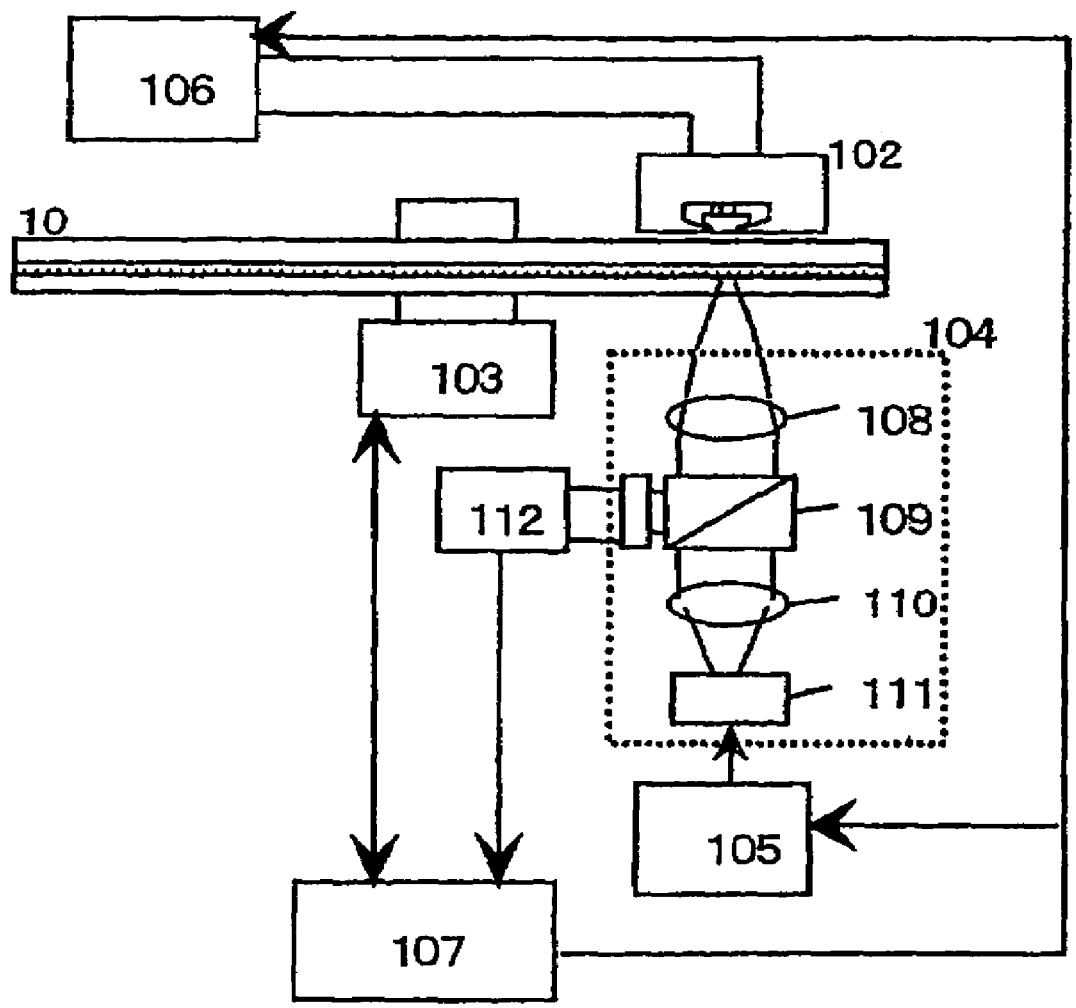
FIG. 1 is a diagram of the structure of a device for recording to and reproducing from a magnetic recording medium by thermal assist in an embodiment of the present invention.
Figure 2:
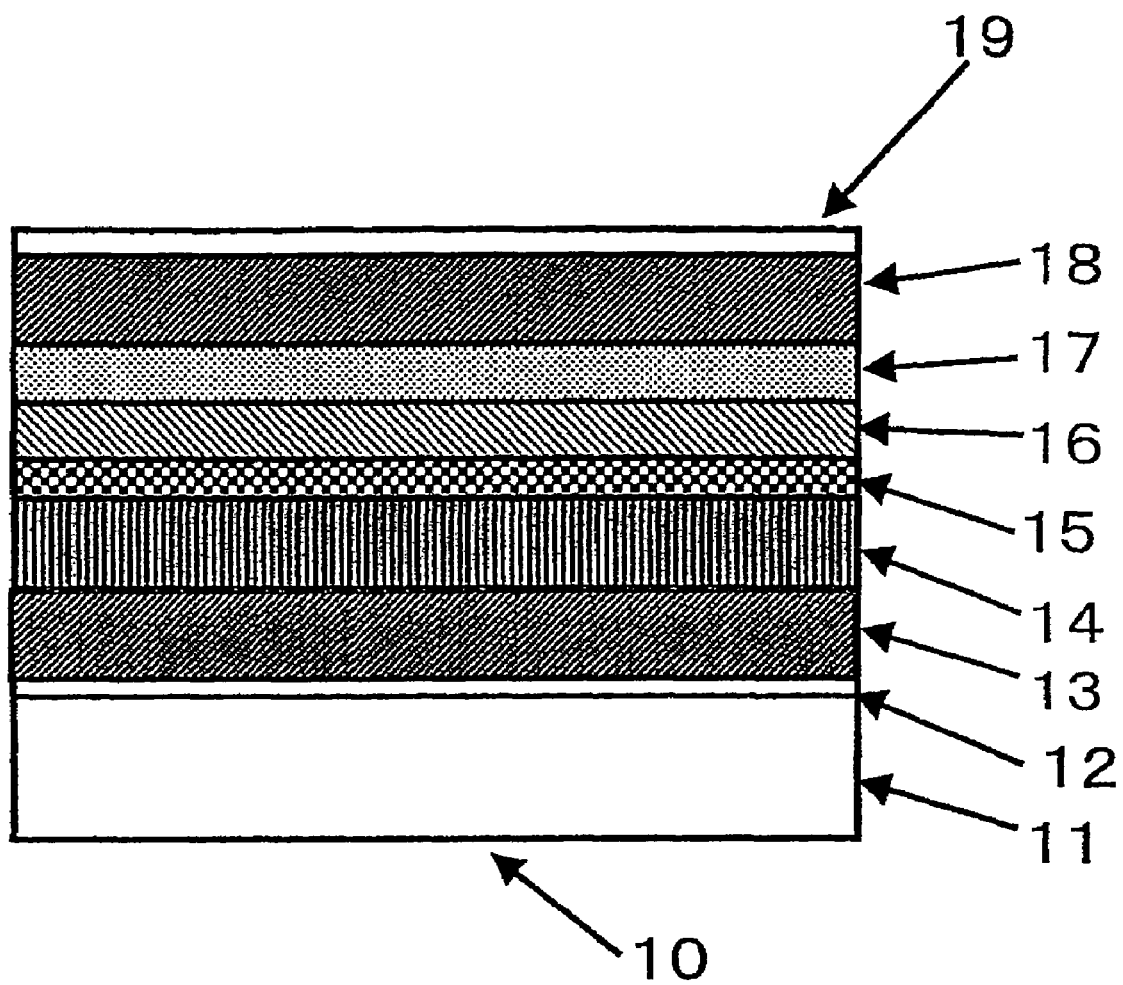
FIG. 2 is a cross section of the structure of the magnetic recording medium in Embodiment 1 of the present invention.

Embodiment 1 of the present invention is described based on FIG. 1 and FIG. 2.

A recording and reproduction device for the magnetic recording medium in an embodiment of the present invention has the constitution shown in FIG. 1. As shown in FIG. 1, information signals are recorded to or reproduced from a magnetic disk 10 attached to a spindle motor 103 by a magnetic head 102 that is controlled by a magnetic head control and detection circuit 106. An optical head 104 for thermally-assisting the magnetic disk 10 during recording and reproduction performs recording and reproduction with the magnetic head 102 while the disk is irradiated with a laser beam controlled by a laser drive circuit 105. The control circuits 107 here control the rotational drive of the spindle motor 103, the servo for the laser beam, and so forth.

When a recording and reproduction device constituted such as this is used, the recording and reproduction of information for the magnetic disk of this embodiment is possible by actuating a tracking servo according to the surface shape of pits and lands or magnetically recorded pits.

The optical head here is shown disposed separate from and in the opposite direction from the magnetic head, but it is also possible to use a constitution in which irradiation is from the same side as the magnetic head, or a constitution in which the magnetic head is integral with the optical head or with a waveguide linked to a light source.

Because of the above constitution, the recording and reproduction device of this embodiment makes possible the recording and reproduction of an information signal with a magnetic head while the magnetic recording medium is heated with an optical head.

FIG. 2 is a cross section of the structure of a magnetic disk 10 in Embodiment 1 of the present invention. In FIG. 2, there are provided a transparent disk substrate 11 composed of glass, a photopolymer layer 12, a under dielectric layer 13, and a magnetic recording film (14, 15, 16 and 17). The magnetic recording film is made up of a recording layer 14, an intermediate layer 15, a control layer 16, and a reproduction layer 17. A protective layer 18 and a solid lubricating protective layer 19 are further provided for protecting the recording film and sliding a magnetic head.

Here, the disk substrate 11 prior to the formation of the under dielectric layer 13 is such that a stamper in which pits have been formed is used to transfer its pattern to a photopolymer 12 coating the glass disk substrate 11, and this product is cured. With this constitution, pits are formed for tracking servo and address detection, and the recording track is designed to allow the detection of pit regions for the servo and data regions where information is recorded.

The magnetic recording medium of the present Embodiment shown in FIG. 2 is constituted such that it can be applied to a magnetic recording medium with which the recording and reproduction of recording marks recorded at high density are possible by irradiating with a laser beam from the disk substrate side and detecting recording and reproduction of signals with a magnetic head 102 from the lubricating protective layer 19 side where the recording layer 14 is formed. This constitution in which the recording and reproduction of signals are detected with a magnetic head can be applied to a magnetic recording medium which makes possible recording and reproduction of recording marks smaller than the detection limit of the laser spot during reproduction.

A characteristic of the recording film 14 in this embodiment is that as the temperature T rises, the coercive force Hc decreases, and the reproduction layer 17 is that as the temperature T rises, the saturation magnetization Ms increases. As a result, the detection sensitivity of reproduction signals can be increased when a GMR head is used for reproduction.

The magnetic recording medium of Embodiment 1 of the present invention shown in FIG. 2 is constituted such that a DWDD system, with which magnetically super resolution reproduction is possible by increasing the signal detection sensitivity during reproduction by successively moving the shifted magnetic domain wall according to the temperature gradient produced by the laser beam, and using an optical head to detect the movement of this domain wall, can be applied to a magnetic recording medium.

The laminated recording film constituted as above is an example of a DWDD (Domain Wall Displacement Detection) system, in which the movement of the domain wall is utilized to increase the amplitude of reproduction signals and the signal quantity. As discussed in Japanese Laid-Open Patent Application H6-290496, for instance, the recording layer comprises a magnetic film having a large interfacial coercivity, the reproduction layer that moves the domain wall is a magnetic film having a small interfacial coercivity, and the intermediate layer used for switching is a magnetic film having a relatively low Curie temperature. Therefore, the key is to use a magnetic film that allows the use of a DWDD system in order to maximize amplitudes of reproduction signals, and the film structure is not limited to the above.

The reproduction principle of the above-mentioned DWDD system will be described through reference to FIG. 8.

Figure 8A:
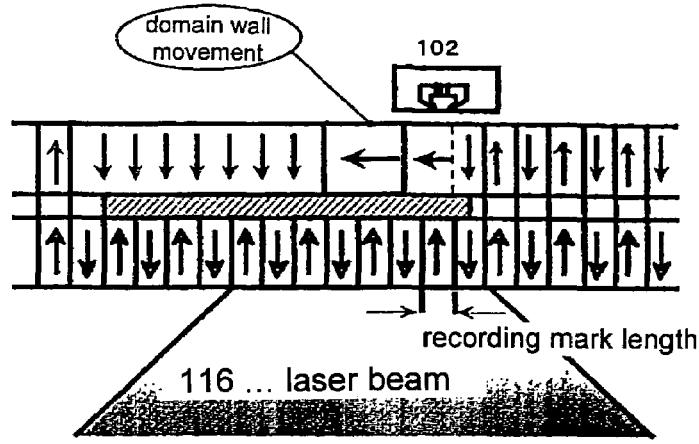
FIG. 8 consists of a cross section and graphs of a magnetic recording medium, used for describing the reproduction operation with the magnetic recording medium in an embodiment of the present invention, with FIG. 8a being a cross section of the constitution (and particularly the direction of magnetization) of the recording film of the magnetic recording medium, FIG. 8b a graph of the temperature distribution inside the medium versus the position of the magnetic recording medium during reproduction, FIG. 8c a graph of the domain wall energy density in the reproduction layer, and FIG. 8d a graph of the force needed to move the domain wall of the reproduction layer.

FIG. 8a is a cross section of a recording film of a rotating magnetic disk. On a disk substrate and a dielectric layer (not shown) is formed a recording film with a three-layer structure comprising a reproduction layer 113, an intermediate layer 114, (a control layer 16 is omitted,) and a recording layer 115, over which is formed (though not depicted) a dielectric layer and an overcoat layer or lubricating sliding layer.

The reproduction layer 113 is made from a magnetic film material with low magnetic disk coercive force, the intermediate layer 114 is a magnetic film with a low Curie temperature, and the recording layer 115 is a magnetic film capable of stably holding a recording magnetic domain even at a small domain diameter. With this magnetic recording medium, the reproduction layer 113 forms a guard band or the like between recording tracks, thereby forming a magnetic domain structure including an unclosed domain wall.

As shown in the drawing, an information signal is formed as a recording magnetic domain that has been thermo-magnetically recorded in the recording layer 115. When not irradiated with the laser spot, and therefore at room temperature, the recording film is securely exchange-coupled to each of the recording layer 115, the intermediate layer 114, and the reproduction layer 113, so the recording magnetic domain of the recording layer 115 is transferred directly to the reproduction layer 113.

Figure 8B:
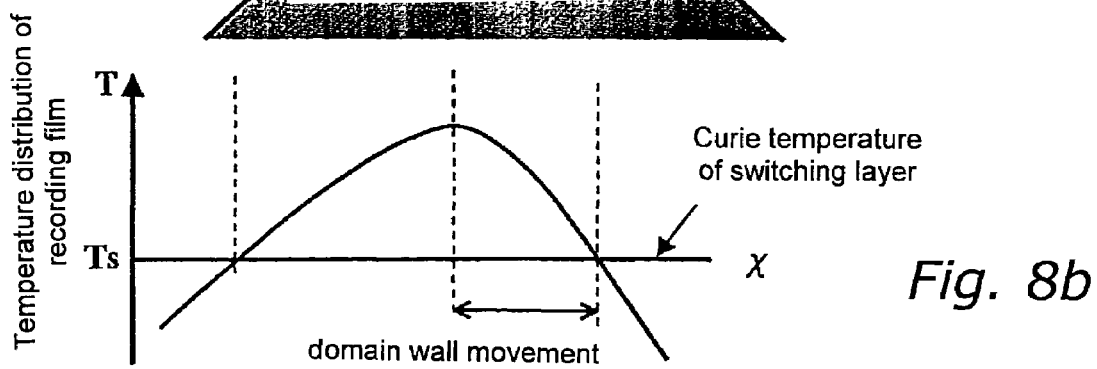

FIG. 8b is a graph of the relation between the temperature T of the recording film and the position $\chi$ corresponding to the cross section of FIG. 8a. As seen in this graph, during reproduction of a recording signal, the disk rotates and is irradiated along its track with a reproduction beam spot produced by the laser beam. Here, the recording film has the temperature distribution shown in FIG. 8b, there is a temperature region Ts in which the intermediate layer 114 (or intermediate isolating layer, or switching layer) is over the Curie temperature Tc, and exchange coupling between the reproduction layer 113 and the recording layer 115 is isolated.

Figure 8C:
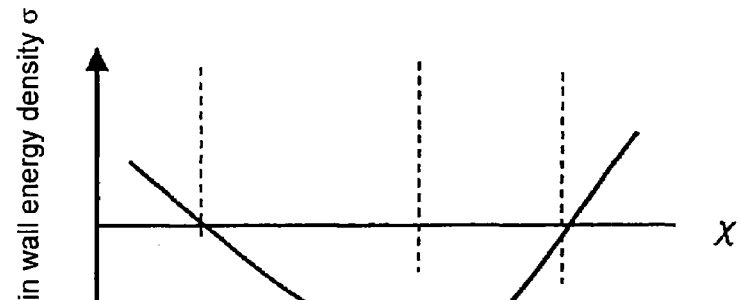
Figure 8D:
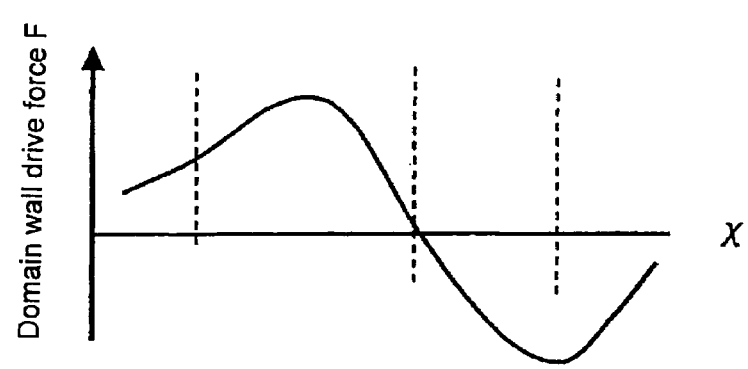

By the temperature distribution of the recording film produced by irradiating the disk with the reproduction beam, as seen by the dependence on the domain wall energy density $\sigma$ in FIG. 8c, there is a gradient in the domain wall energy density $\sigma$ in the $\chi$ direction of the disk rotation direction corresponding to the positions in FIGS. 8a and 8b, so as shown in FIG. 8d, a force F that drives the domain wall acts on the domain wall in each layer at the position $\chi$.

As shown in the drawing, the force F acting on the recording film acts to move the domain wall toward a lower domain wall energy density $\sigma$. The reproduction layer 113 has a low domain wall coercive force and a high domain wall mobility, so with just the reproduction layer 113 when it has an unclosed domain wall, the domain wall readily moves under this force F. Therefore, the domain wall of the reproduction layer 113 instantly moves to the region in which the temperature is high and the domain wall energy density is low, as indicated by the arrow.

As a result, regardless of the size of the recording magnetic domain, the size of the reproduction magnetic domain is always at a specific maximum amplitude. Accordingly, when signal reproduction is performed with an optical head or with a GMR head or other such magnetic head, the temperature gradient produced by the light beam or the like expands the transfer magnetic domain in the reproduction layer 113, thereby always resulting in a signal quantity of the specific maximum amplitude.

As shown in FIGS. 1 and 2, this magnetic recording medium 10 is used in magnetic recording and reproduction involving thermal assist, and a magnetic recording film composed of a ferrimagnetic body is formed on glass or another such transparent supporting substrate. In this embodiment, the magnetic recording film is constituted by a recording layer 14 (film thickness of 100 nm), an intermediate layer 15 (20 nm), a control layer 16 (15 nm), and a reproduction layer 17 (40 nm), but is not particularly limited to these film thicknesses.

The recording layer 14 of the magnetic recording medium 10 has a magnetic compensation temperature that is close to room temperature, and is specifically set from −100 to 180° C., and preferably, from −60 to 100° C., and even more preferably from −20 to 60° C. The Curie temperature of the recording layer 14 is set between 200 and 400° C., and preferably between 250 and 360° C.

An example of the material of which the recording layer 14 is made is an alloy composed of three metals, namely, terbium, iron, and cobalt. It is commonly known that with a magnetic film composed of an alloy such as this the magnetic compensation temperature varies with the terbium content.

The magnetic film produced in Embodiment 1 has, for example a composition of $Tb_{27}Fe_{54}Co_{19}$ (the numbers indicate the atom percentages), its magnetic compensation temperature is close to 60° C., and its Curie point is at least 310° C. Therefore, if we examine the temperature characteristics of this magnetic recording film, we see that the coercive force decreases as the temperature rises, and in the case of thermal assist, a magnetic head can be used to record with a small magnetic field.

The intermediate layer 15 is TbFeCoCr with a magnetic compensation temperature of room temperature or lower and a Curie temperature of 180° C. The control layer 16 is TbFeCoCr with a magnetic compensation temperature of 40° C. and a Curie temperature of 230° C.

The reproduction layer 17 in the magnetic recording medium 10 is a GdFeCoCr magnetic thin film with a magnetic compensation temperature of −50° C. and a Curie temperature of 290° C.

Because the magnetic compensation temperature of the reproduction layer is set close to room temperature, the saturation magnetization of the reproduction layer increases with the temperature, reaching a maximum near the reproduction temperature from 100 to 220° C., and thereafter decreasing. In this case, reproduction signal output can be further increased because the saturation magnetization increases, in combination with the expansion of the reproduction magnetic domains by domain wall movement that results from a DWDD system.

In this embodiment, the saturation magnetization Ms reaches its maximum at 150° C., which is the temperature attained when the light beam irradiates the disk. Another film characteristic is that the coercive force Hc of the recording layer decreases as the temperature rises, and even when tiny magnetic domains are recorded, stable recording magnetic domains can still be formed, and even in repeated recording and reproduction with a magnetic head, recording and reproduction with excellent signal characteristics will be possible.

Thus, with the magnetic recording medium of this embodiment, during the recording of information, the disk is rotated and irradiated with the laser spot along the track while the recording magnetic field is modulated with a magnetic head. Here, the coercive force of the recording layer decreases at higher temperatures, which is why recording with the small magnetic field of a magnetic head is possible. Also, during recording and reproduction, the disk is irradiated with the laser beam and the temperature is raised while the recording magnetic domains are expanded by domain wall movement using the above-mentioned DWDD system, while the recording magnetic domains are detected by the GMR head. Here, if the constitution is such that the saturation magnetization Ms of the reproduction layer rises along with the temperature, the reproduction signal will be largest at elevated temperatures, so detection sensitivity with the GMR head is better and there is an increase in the reproduction signals.

An experiment into the recording and reproduction of an information signal to the recording track of the magnetic recording medium 10, which was conducted using the above-mentioned thermally-assisted recording and reproduction device and the magnetic recording medium 10, will be described. The GMR head 102 used here had a width of 0.5 μm in the direction perpendicular to the track, the light spot size was approximately from 0.7 μm to 1.5 μm, and the optical power was 4 mW during recording and 3 mW during reproduction. The disk speed was 4000 rpm, and the reference frequency during recording was 200 MHz.

Figure 3A:
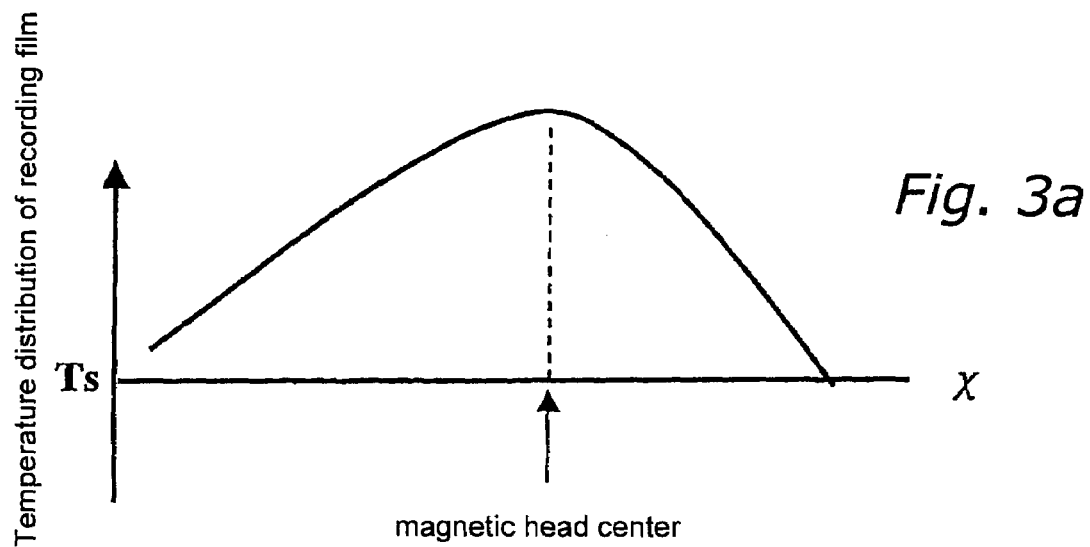
FIG. 3 consists of graphs of the profile of the temperature distribution in the magnetic recording medium in Embodiment 1 of the present invention under thermal assist FIG. 3a during recording and FIG. 3b during reproduction.
Figure 3B:
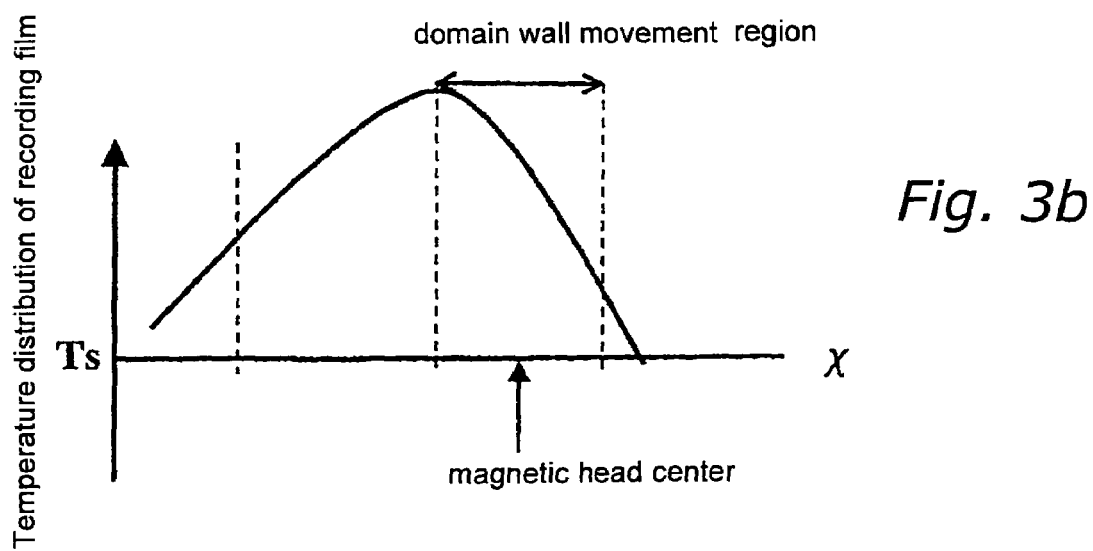

FIG. 3a is a graph of the temperature profile of the magnetic recording medium when irradiated with a light beam during recording, and FIG. 3b is a graph of the temperature profile of the magnetic recording medium when irradiated with a light beam during reproduction.

In the past, the laser beam used for thermal assist heated the recording film by irradiating in the same optical profile during both recording and reproduction. In contrast, with this embodiment, the optical profiles are different during recording and reproduction, which makes possible the recording or reproduction detection of fine marks with good precision. This change in the optical profile of the irradiating laser beam can be accomplished by varying the position on the magnetic head irradiated by the light, or by varying the wavelength of the irradiating laser beam, the refractive index of the optical system, the numerical aperture, and so forth.

Thus, with the method for recording to and reproducing from a magnetic recording medium of Embodiment 1 of the present invention, during recording the laser power of the light source is increased to 4 mW, and the focus is offset so that the size (the width of $1/e^2$) of the light spot is 1.5 μm, so that thermal assist is performed on the magnetic recording medium 10 near the recording-use magnetic head. Here, the temperature distribution gradient is less than steep in the recording region of the magnetic recording medium 10 than during reproduction, and the temperature of the recording region of the magnetic recording medium 10 is 150° C. or higher, so the coercive force is 6 koe or lower. Accordingly, the magnetic head 102 can record with a smaller magnetic field, which facilitates modulation of the magnetic field at high frequencies. Furthermore, the movement of domain walls produced by the temperature gradient during recording has little effect, and the shape of the recording marks does not change, so stable recording is possible.

Also, during signal reproduction, thermal assist is provided by the laser beam source focused on the recording film of the magnetic recording medium so that the size (the width of $1/e^2$) of the light spot is 0.7 μm, and the peak of the temperature distribution is to the rear of the position of the reproduction-use GMR head. This means that in the region near the GMR head where signal reproduction detection from the magnetic recording medium is performed, the temperature distribution gradient of the recording film is greater during signal reproduction than during recording, which facilitates the movement of domain walls in the above-mentioned DWDD system, and makes possible the reproduction of signals of expanded magnetic domain.

Therefore, even when fine magnetic domains are recorded at high density in a thermally-assisted recording and reproduction system, stable recording domains can be formed, and during signal reproduction, the signal will be recorded and reproduced at a good S/N ratio.

Also, during signal reproduction, the temperature outside the read region drops to 120° C. or lower. Accordingly, the temperature outside the read region, such as the adjacent track where the recording layer of the magnetic recording medium 10 is not irradiated with the laser beam is sufficiently remote from the temperature range of 150 to 250° C., which is the temperature reached by the read region of the magnetic film in the magnetic recording medium 10, so the problem of cross talk occurring during reproduction is also prevented. Here, the light spot forms the temperature profile having an approximately Gaussian shape.

In addition, when the saturation magnetization near room temperature of the magnetic recording medium 10 is kept low, there will be little effect of the magnetic flux produced by residual magnetization from the magnetic film outside the region where there is no irradiation by the light beam (that is, the read region), so there is a further reduction in cross talk and cross write.

The magnetic recording medium 10 of the present invention is particularly effective when the magnetic recording medium and the head are tightly sealed, as when the magnetic recording and reproduction device is an ordinary hard disk. This is a closed state in which the magnetic recording medium and the head are fixed, so keeping the thermal assist stable affords a more stable effect in recording and reproduction.

As mentioned above, with the constitution of the present embodiment, even when recording and reproducing at high density, the magnetic recording medium and the method for recording to and reproducing from the magnetic recording medium can be achieved, in which stable recording magnetic domains can be formed, reproducing signals with high quality can be detected.

Embodiment 2

Next, the method for recording to and reproducing from a magnetic recording medium of Embodiment 2 of the present invention will be described.

First, the method for the recording and reproduction of information by the thermally-assisted recording and reproduction method pertaining to the present invention involves a recording and reproduction device and a magnetic recording medium as shown in FIGS. 1 and 2, just as in Embodiment 1. Therefore, just as in Embodiment 1 of the present invention, an information signal is recorded to the magnetic recording medium 10 by the magnetic head 102 under thermal assist, and during signal reproduction, the magnetic head reproduces the signal under thermal assist. As shown in FIG. 2, the magnetic recording medium 10 here is formed by a recording film with a multilayer structure, the signal recorded in the recording layer 14 is transferred to the reproduction layer 17, the magnetic domains are expanded by movement of domain walls, and the reproduction signal is detected.

Here, a bias current is applied by a bias current control component of a control component 106 to the magnetic head 102 during reproduction, and information is outputted as a reproduction signal by means of bias current and the change in resistance (magneto-restrictive effect) originating in the change in the direction of magnetization in the read region. The outputted reproduction signal is amplified and shaped by a reproduction amplifier, and outputted to a signal processor. The bias current control component follows commands from a controller, so that the bias current applied to the magnetic head 102 can be adjusted.

Figure 4A:
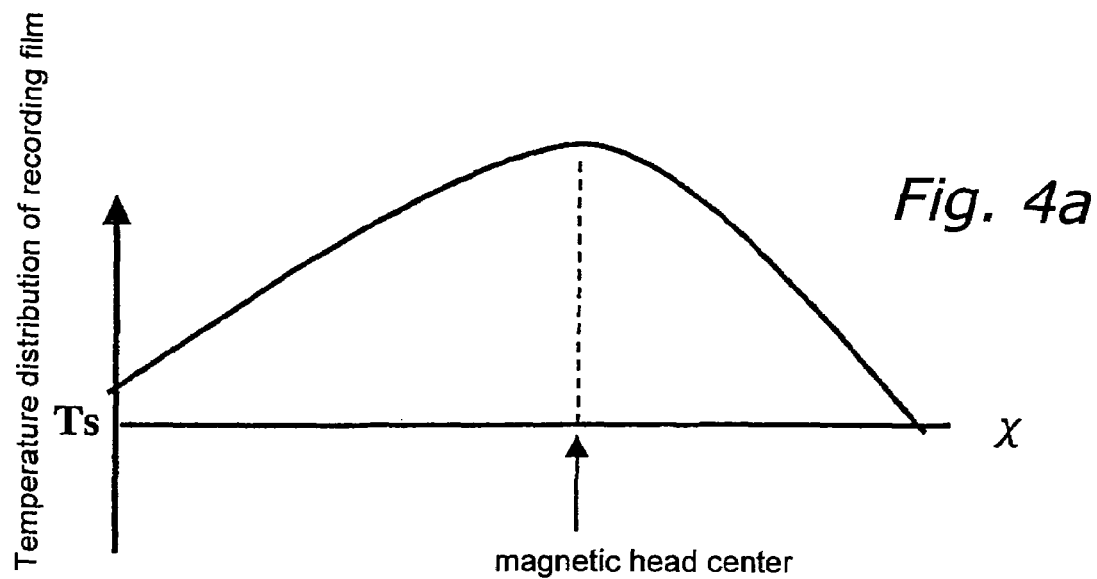
FIG. 4 consists of graphs of the profile of the temperature distribution in the magnetic recording medium in Embodiment 2 of the present invention under thermal assist FIG. 4a during recording and FIG. 4b during reproduction.
Figure 4B:
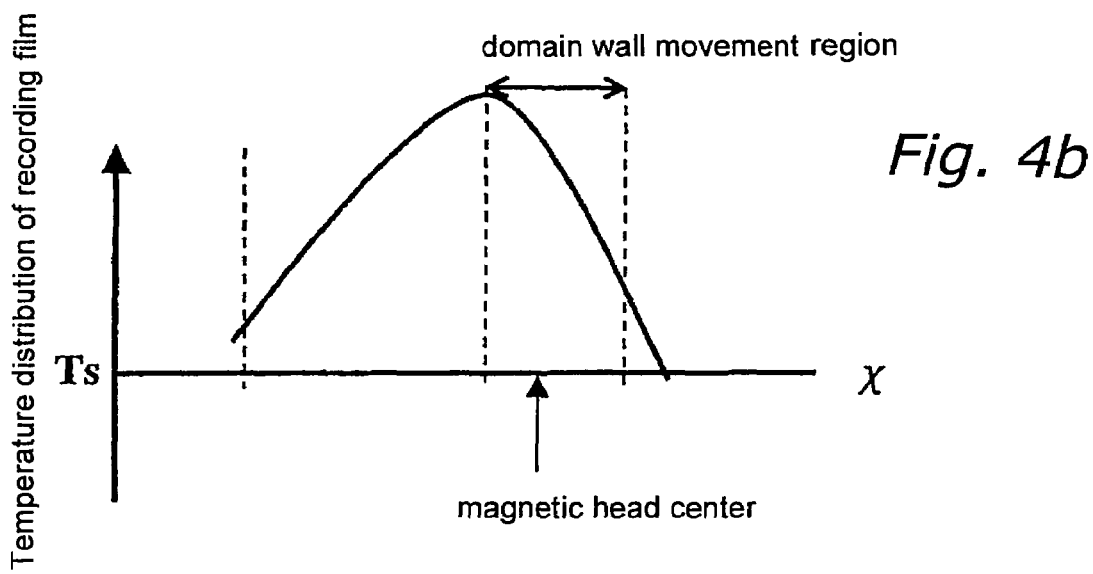

FIG. 4a shows is a graph of the temperature profile of the magnetic recording medium when irradiated with a light beam during recording, and FIG. 4b is a graph of the temperature profile of the magnetic recording medium when irradiated with a light beam during reproduction. With the method for recording to and reproducing from a magnetic recording medium in this embodiment, a semiconductor laser (laser diode) has a two-wavelength structure, so that during recording the light source emits a laser beam with a wavelength of 780 nm, and during reproduction it emits a laser beam with a wavelength of 650 nm. Also, since the characteristics of the object lens are set such that the numerical aperture will be 0.6 at 650 nm, at the recording wavelength of 780 nm, thermal assist comes into play in an open state.

Therefore, during recording, as shown in FIG. 4a, the temperature distribution gradient is less than steep in the recording region of the magnetic recording medium 10 than during reproduction, and the temperature of the recording region of the magnetic recording medium 10 is 150° C. or higher, so the coercive force of the recording film is 4 koe or lower. Accordingly, the magnetic head 102 can record with a rather smaller magnetic field, which facilitates modulation of the magnetic field at high frequencies. Furthermore, the movement of domain walls produced by the temperature gradient during recording has little effect, and the shape of the recording marks does not change, so stable recording is possible.

Also, during signal reproduction, as shown in FIG. 4b, thermal assist is provided by the laser beam having the short wavelength of 650 nm from the laser beam source focused on the recording film of the magnetic recording medium, and the peak of the temperature distribution is to the rear of the position of the reproduction-use GMR head. This means that in the region near the GMR head where signal reproduction detection from the magnetic recording medium is performed, the temperature distribution gradient of the recording film is greater during signal reproduction than during recording, which facilitates the movement of domain walls in the above-mentioned DWDD system, and makes possible the reproduction of signals of expanded magnetic domain.

At this point the laser beam power during recording is set to 4.5 mW, and the laser beam power during reproduction to 3.5 mW.

Therefore, even when fine magnetic domains are recorded at high density in a thermally-assisted recording and reproduction system, stable recording domains can be formed, and during signal reproduction, the signal will be recorded and reproduced at a good S/N ratio.

Also, with a magnetic recording and reproduction method involving thermal assist, residual magnetization can be reduced in the room temperature region (where no heating is caused by the laser beam), so even if the distance of the reproduction-use magnetic head perpendicular to the track (i.e., the gap width) is greater than the track pitch at which the information has been recorded, it will still be possible to keep cross talk from adjacent tracks sufficiently low, and information recorded at high density can be reproduced.

As mentioned above, with the constitution of the present embodiment, even when recording and reproducing at high density, the magnetic recording medium and the method for recording to and reproducing from the magnetic recording medium can be achieved, in which stable recording magnetic domains can be formed, reproducing signals with high quality can be detected.

In this embodiment, the wavelength of the laser beam light source emitted with thermal assist was varied between during recording and during reproduction, but it is also possible to use an optical head including an optical element, or to switch the numerical aperture NA of the object lens.

Embodiment 3

The method for recording to and reproducing from a magnetic recording medium of Embodiment 3 of the present invention will now be described.

First, the method for the recording and reproduction of information by the thermally-assisted recording and reproduction method pertaining to the present invention is a recording and reproduction method for magnetic recording and reproduction under thermal assist, just as in Embodiment 1. Therefore, just as in Embodiment 1 of the present invention, an information signal is recorded to the magnetic recording medium by the magnetic head 102 under thermal assist, and during signal reproduction, a GMR head reproduces the signal under thermal assist.

As shown in FIG. 2, the magnetic recording medium 10 here is formed by a recording film with a multilayer structure, the signal recorded in the recording layer 14 is transferred to the reproduction layer 17, the magnetic domains are expanded by movement of domain walls, and the reproduction signal is detected.

Figure 5:
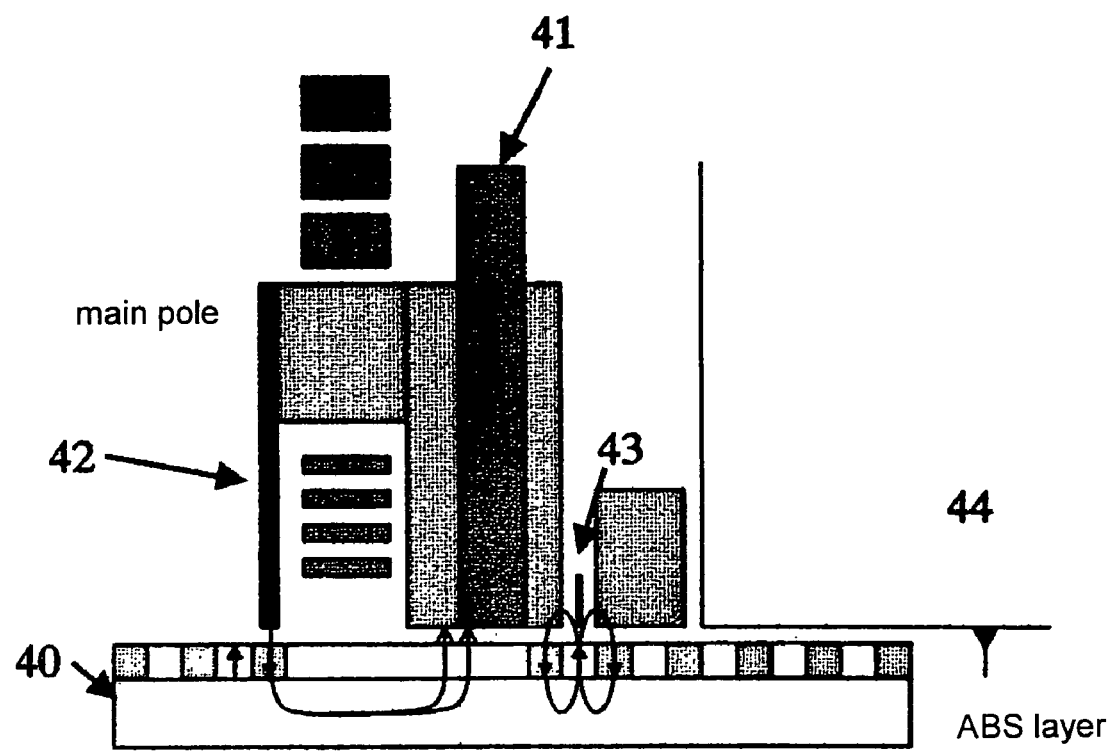
FIG. 5 is a cross section of the structure of the recording and reproduction head of the magnetic recording medium in Embodiment 3 of the present invention.

In this embodiment, the head configuration is as shown in FIG. 5, in which a laser beam from a light source used for thermal assist is integrated with a magnetic head. The laser beam light source irradiates a magnetic recording medium 40 through a waveguide, and thermal assist is performed.

This will now be described through reference to the drawing. FIG. 5 is a cross section of the magnetic head pertaining to the method for recording to and reproducing from a magnetic recording medium of this embodiment. As shown in the drawing, a waveguide 41 for irradiating the magnetic recording medium 40 with light from the laser beam light source is disposed between a magnetic recording head 42 and a magnetic reproduction head 43. This magnetic head is attached to a slider 44 made of a resin material.

With this magnetic head, during signal recording the laser beam goes through the waveguide 41, and the light irradiates and heats the recording region of the magnetic recording medium while the magnetic recording head 42, which includes the main pole, modulates the magnetic field according to the recorded information. During signal reproduction, the light from the laser beam light source goes through the waveguide 41 and irradiates the magnetic recording medium just as it does during recording, and the reproduction-use GMR head 43 is used to detect changes in the direction of magnetization of the recording signal.

The laser light source here has a two-wavelength semiconductor laser, so that during recording the light source emits light with a wavelength of 780 nm, and during reproduction it emits light with a wavelength of 650 nm. Further, in this embodiment, during recording the laser beam is pulsed at a pulse width of 50% duty in synchronization with the recorded information.

With the constitution of this embodiment, the thermally-assisted laser beam irradiates from the film side having the recording layer, so there is no need for the disk substrate 11 to be a transparent glass substrate, and a metal substrate such as an aluminum alloy can be used instead.

The temperature profile for the magnetic head on the magnetic recording medium is different during signal recording and during reproduction, and the temperature distribution gradient near the reproduction-use GMR head can be larger during reproduction than during recording.

The temperature gradient near the recording edge is particularly gentle during signal recording, and domain wall movement of the recording marks is suppressed because pulses are irradiated coinciding with the recording signals, so this makes possible the recording of fine marks at high density.

Therefore, even when fine magnetic domains are recorded at high density in a thermally-assisted recording and reproduction system, stable recording domains can be formed, and during signal reproduction, the signal will be recorded and reproduced at a good S/N ratio.

In this embodiment, since the GMR head 43 is integrated with the waveguide 41 of the thermally-assisted optical irradiation component, the amount of heat generated inside the head may vary, but the characteristics with respect to temperature changes and the amount of heat generated by the GMR head 43 can also be controlled by controlling the bias current. Therefore, with a thermally-assisted recording and reproduction method in which the magnetic recording medium 40 is used, instability in the reproduction operation caused by temperature changes in the magnetic head and the magnetic recording medium 40 can be reduced by adjusting the bias current.

Also, since it is possible to evaluate the quality of the reproduction signal from the GMR head 43 with the controller and the signal processor, the bias current of the GMR head can be adjusted in real time while the quality of the reproduction signal is evaluated, so the bias current settings can be adjusted according to changes in the reproduction state, which affords greater reliability in the reproduction operation.

The quality of a reproduction signal can be evaluated as follows, for example. A jitter value or error rate is found by the signal processor, the bias current is set so as to minimize this value, and the bias current control component is controlled on the basis of this setting.

With Embodiment 3, there is additionally an effect on adjacent tracks caused by the thermal distribution caused by thermal assist during recording and reproducing on the magnetic recording medium 40, so information reproduction of extremely high reliability is possible. Also, the detection signal from outside the read region (that is, from the non-heated region) can be utilized to evaluate the quality of a reproduction signal. Specifically, the bias current can be set by evaluating the reproduction signal level from the GMR head 43 in a state in which the magnetic recording medium 40 has not been heated (that is, a state in which the magnetic recording medium 10 has not been irradiated with the laser beam).

Also, in an embodiment of the present invention, it is possible to perform evaluation by reproducing information that has been prerecorded in an evaluation region, which is a predetermined region on the magnetic recording medium 40. That is, when setting the bias current, first the evaluation region on the magnetic recording medium 40 is accessed, the fixed information pattern that has been recorded there is reproduced to evaluate the signal quality, and the bias current of the GMR head is set on the basis of this result. This method allows reproduction signal evaluation to be performed easily and quickly, so access is faster and the reliability of setting the bias current is increased.

Furthermore, by providing an evaluation region as above, there is no need to search for the region where the information is recorded, and the evaluation region where the fixed information has been recorded can be reached merely by accessing the evaluation region at its predetermined address in a state of no optical irradiation.

As discussed above, with the thermally-assisted method for recording to and reproducing from a magnetic recording medium of Embodiment 3, the magnetic head and the optical irradiation component are integrated, the wavelength of the light source is varied so as to change the temperature profile in the recording and reproduction region of the magnetic recording medium, and the optimal bias current is applied to the GMR head while recording and reproduction are performed, the result of which is that even when fine magnetic domains are recorded at high density, stable recording domains can be formed, and during signal reproduction, the signal will be recorded and reproduced at a good S/N ratio.

As mentioned above, with the constitution of the present embodiment, even when recording and reproducing at high density, the magnetic recording medium and the method for recording to and reproducing from the magnetic recording medium can be achieved, in which stable recording magnetic domains can be formed, reproducing signals with high quality can be detected.

Embodiment 4

Next, the method for recording to and reproducing from a magnetic recording medium of Embodiment 4 of the present invention will be described.

First, the method for the recording and reproduction of information by the thermally-assisted recording and reproduction method pertaining to the present invention involves a recording and reproduction device and a magnetic recording medium as shown in FIG. 1, just as in Embodiment 1. Therefore, just as in Embodiment 1 of the present invention, an information signal is recorded to the magnetic recording medium 50 by the magnetic head 102 shown in FIG. 2 under thermal assist, and during signal reproduction, the magnetic head reproduces the signal under thermal assist. As shown in FIG. 2, the magnetic recording medium 50 here is formed by a recording film with a multilayer structure, the signal recorded in the recording layer 14 is transferred to the reproduction layer 17, the magnetic domains are expanded by movement of domain walls, and the reproduction signal is detected.

Figure 6:
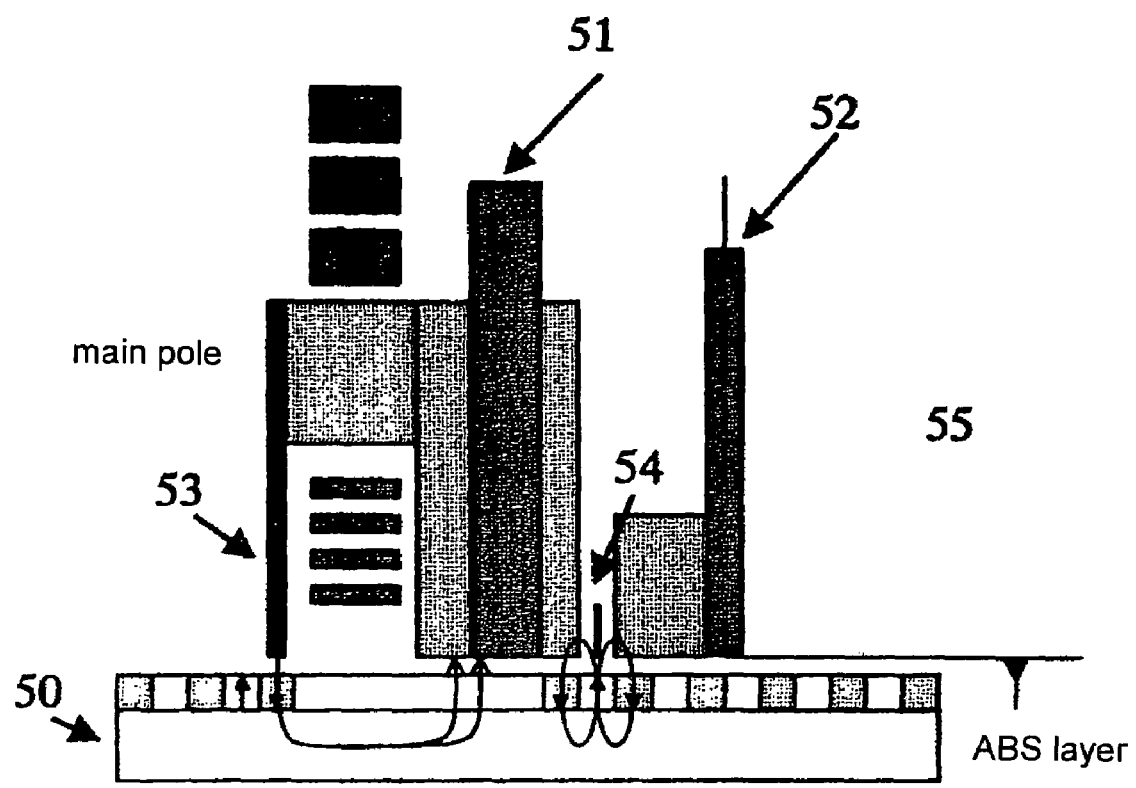
FIG. 6 is a cross section of the structure of the recording and reproduction head of the magnetic recording medium in Embodiment 4 of the present invention.

However, with this embodiment, as shown in FIG. 6, the magnetic head is integrated with the waveguide from the laser light source used for thermal assist. The waveguide used for thermal assist is a dual system comprising a recording light source waveguide and a reproduction light source waveguide.

The method for recording to and reproducing from a magnetic recording medium of Embodiment 4 of the present invention will be described through reference to the drawings. FIG. 6 is a cross section of the structure of the magnetic head pertaining to the method for recording to and reproducing from a magnetic recording medium of this embodiment. As shown in the drawing, a waveguide 51 for irradiating a magnetic recording medium 50 with light from a laser light source is disposed between a magnetic recording head 53 and a magnetic reproduction head 54. A reproduction waveguide 52 is disposed on the slider 55 side of the magnetic reproduction head 54. Further, these magnetic heads are attached to the slider 55, which is made of a resin material.

With this constitution, during signal recording to the magnetic recording medium 50, the laser beam goes through the recording waveguide 51 and irradiates the magnetic recording medium with light, which heats the recording region, while the magnetic recording head 53, which includes the main pole, modulates the magnetic field according to the recorded information. During signal reproduction, the laser beam goes through the reproduction waveguide 52 and irradiates the magnetic recording medium with light from the laser light source, and the reproduction-use GMR head 54 is used to reproduce the signal.

The laser light source here irradiates the magnetic recording medium 50 by going through a waveguide, using a semiconductor laser with a wavelength of 650 nm (pulse duty of 50%), both during recording and during reproduction. Accordingly, during recording, 4 mW of laser beam power is introduced into the recording waveguide 51 and irradiates the magnetic recording medium 50. During signal reproduction, the laser beam power is set to 4.5 mW, the optical path is switched to the reproduction waveguide 52 side, and the magnetic recording medium 50 is irradiated. At this point, the reproduction waveguide 52 is adjusted such that the emitted light spot diameter is smaller than that with the recording waveguide 51. This makes it possible to form a larger temperature profile on the magnetic recording medium 50 during reproduction than during signal recording.

The effect of the above constitution will be even better if the duty of the laser beam pulse width is varied between recording and reproduction.

Also, the above-mentioned constitution may be such that the optical constants (such as refractive index and extinction coefficient) are different between the recording waveguide and the reproduction waveguide.

Also, the temperature distribution may be varied by changing the linear velocity by varying the disk rotational speed during recording and during reproduction.

Here, the magnetic recording medium 50 is controlled in its rotation to a specific angular velocity because of the requirements on access performance. Accordingly, there are changes in the linear velocity between the inner and outer peripheries of the magnetic recording medium 50, with the linear velocity being higher at the outer periphery and decreasing toward the inner periphery. Changes in linear velocity also change the amount of life of the magnetic head 102. Because of this, there is also considerable change in the temperature distribution and heating temperature in the region of recording and reproduction by the magnetic head 102 between the inner and outer peripheries of the magnetic recording medium 50.

Therefore, in Embodiment 4, the magnetic recording medium 50 is divided into a plurality of regions from its inner periphery to its outer periphery, and the rotational speed is switched for each region, which allows the rotational speed within each region to be kept constant.

Furthermore, a plurality of evaluation regions may be provided, the quality of the reproduction signal evaluated for the evaluation region closest to the region where reproduction is actually being performed, and the thermal assist power setting, the bias current setting for the GMR head, and so forth may be made on the basis of this, which allows information to be recorded and reproduced at high reliability over the entire magnetic recording medium 50. This makes it possible to adjust the profile of the heating temperature distribution for each region.

Another effect of providing a plurality of evaluation regions is that it takes less time to access each evaluation region. The plurality of evaluation regions may be set up equidistantly in the radial direction of the magnetic recording medium 50, or, when the magnetic recording medium 50 is divided into zones by isolating out a plurality of tracks, it is preferable to set an evaluation region for each zone. Furthermore, the recording and reproduction in these evaluation regions are preferably carried out during an information recording or reproduction standby mode. Doing this eliminates the effect on the real recording and reproduction, so the recording and reproduction performance of the magnetic recording and reproduction device does not decrease because of the bias current setting.

Also, in this embodiment, a temperature sensor may be installed near the read region (reproduction region) on the magnetic recording medium 50. When the bias current is set using a temperature sensor in this manner, first, the ambient temperature of the magnetic recording medium 50 is monitored by this temperature sensor, the temperature information is inputted to the controller, and the controller decides whether or not a specific, predetermined temperature change has occurred from the temperature when the bias current was set the previous time. If the specific temperature change has occurred, the quality of the reproduction signal is evaluated, and the setting of the bias current is performed on the basis of this result.

As discussed above, with the thermally-assisted method for recording to and reproducing from a magnetic recording medium of Embodiment 4, the magnetic head and the optical irradiation component are integrated, a recording waveguide is used to irradiate the magnetic recording medium with light from the light source while recording is performed by the magnetic recording head, and a reproduction waveguide is used to irradiate the magnetic recording medium with light from the light source while reproduction is performed by the magnetic reproduction head. Here, since the recording waveguide and reproduction waveguide are each used to irradiate the magnetic recording medium with light from the light source, a relative position of the temperature profile and the magnetic head in the recording and reproduction region of the magnetic recording medium is different during recording and during reproduction. Further, recording and reproduction are performed while an evaluation region is used to control the irradiation power during recording and reproduction and the optimal bias current going to the GMR head, so even when tiny magnetic domains are recorded at high density, stable recording magnetic domains can still be formed, and even in repeated recording and reproduction, recording and reproduction with excellent S/N ratio will be possible.

As mentioned above, with the constitution of the present embodiment, even when recording and reproducing at high density, the magnetic recording medium and the method for recording to and reproducing from the magnetic recording medium can be achieved, in which stable recording magnetic domains can be formed, reproducing signals with high quality can be detected.

Embodiment 5

Next, the method for recording to and reproducing from a magnetic recording medium of Embodiment 5 of the present invention will be described.

A film constitution of the magnetic recording medium used here is the same as the conventional film constitution.

Just as in Embodiment 3, the method for the recording and reproduction of information by the thermally-assisted recording and reproduction method pertaining to the present invention involves the head structure shown in FIG. 5, in which a magnetic head is integrated with a laser beam from a light source used for thermal assist. In this recording and reproduction method, the magnetic recording medium is irradiated with light from the laser beam using a waveguide, and magnetic recording and reproduction are performed under thermal assist. With this constitution, an information signal is recorded to the magnetic recording medium 40 by the magnetic head 42 under thermal assist, and during reproduction, the signal is reproduced by a GMR head under thermal assist.

As the same as shown in FIG. 2, the magnetic recording medium 40 here is formed by a recording film with a multilayer structure, the signal recorded in the recording layer 14 is transferred to the reproduction layer 17, the magnetic domains are expanded by movement of domain walls, and the reproduction signal is detected.

However, this embodiment is a recording and reproduction method in which the temperature profile is varied by irradiating with a pulsed laser beam (the light source used for thermal assist) during both recording and reproduction.

Here, the pulse width of the laser light source and the laser beam power are controlled according to the signal characteristics during recording and during reproduction, which makes it possible to vary the temperature profile of the recording and reproduction region of the magnetic recording medium.

Also, the level of intensity of the pulsed laser beam can also be controlled in multivalued fashion, rather than just the pulse width, which makes it possible to change the irradiation power level in finer gradations, so the optimal conditions can be set for recording and for reproduction.

As a result, with the thermally-assisted method for recording to and reproducing from a magnetic recording medium of Embodiment 5, the magnetic head and the optical irradiation component are integrated, and the light source pulse width and irradiation power level are varied, thereby varying the temperature profile in the recording and reproduction region of the magnetic recording medium, and the GMR head is controlled to the optimal bias current while recording and reproduction are performed, so that even when fine magnetic domains are recorded at high density, stable recording domains can be formed, and during signal reproduction, the signal will be recorded and reproduced at a good S/N ratio. In particular, during recording, the stable recording can be performed with such as a small shift of the fine recording domain walls because the recording magnetic field can be reversed in the temperature field having a larger temperature gradient of the coercive force by synchronizing the recording signal and a timing of the light emitting pulse for the thermal-assist.

As mentioned above, with the constitution of the present embodiment, even when recording and reproducing at high density, the magnetic recording medium and the method for recording to and reproducing from the magnetic recording medium can be achieved, in which stable recording magnetic domains can be formed, reproducing signals with high quality can be detected.

Embodiment 6

An embodiment of the magnetic recording medium of the present invention will now be given.

The magnetic recording medium in this embodiment has the same structural cross section as the magnetic recording medium 10 in Embodiment 1, shown in FIG. 2.

Just as in Embodiment 1, the magnetic recording medium of the present Embodiment shown in FIG. 2 is constituted such that it can be applied to a magnetic recording medium with which the recording and reproduction of recording marks recorded at high density are possible by irradiating with a laser beam from the disk substrate side and detecting recording and reproduction of signals with a magnetic head 102 from the lubricating protective layer 19 side where the recording layer 14 is formed. This constitution in which the recording and reproduction of signals are detected with a magnetic head can be applied to a magnetic recording medium which makes possible recording and reproduction of recording marks smaller than the detection limit of the laser spot during reproduction.

The magnetic recording medium here is thermally assisted by being irradiated with a laser beam from the disk substrate side, and with the magnetic recording medium of this embodiment, the above-mentioned under dielectric layer 13 is made of a material whose absorption coefficient varies with the wavelength. This material of the under dielectric layer 13 whose absorption coefficient varies with the wavelength is a material such as selenium, PbSe, PbS, or PbTe, but is not particularly limited to these materials.

Just as in Embodiment 2 of the present invention, this may be a method for recording to and reproducing from a magnetic recording medium in which the wavelength of the irradiating light is different during recording and during reproduction, with the thin film layer on the side where the light is projected having an absorption coefficient that varies with the wavelength.

Therefore, the description so far has been of a structure in which the magnetic head and the optical head are separated, in which the absorption coefficient of the thin film layer on the substrate side of the base was varied, but when the magnetic head and the optical irradiation heating unit are integrated, a protective layer on the side where the film is irradiated with light may be made of a material with a different absorption coefficient.

With this constitution, just as with the above method for recording to and reproducing from a magnetic recording medium, when the laser beam wavelength is varied between recording and reproduction, the absorption of light by the dielectric layer varies, and as a result, there is an even more pronounced change in the temperature profile between recording and reproduction.

As discussed above, the magnetic recording medium of this embodiment is such that the thin layer on the side where light is projected has an absorption coefficient that varies with the wavelength, so there temperature profiles during recording and during reproduction are different, and even when recording and reproduction are performed at high density, stable recording magnetic domains can be formed, an excellent reproduction signal can be detected, and furthermore, a highly reliable magnetic recording medium can be realized.

Embodiment 7

An embodiment of the magnetic recording medium of the present invention will now be given.

The magnetic recording medium in this embodiment has the same structural cross section as the magnetic recording medium 10 in Embodiment 1, shown in FIG. 2.

Just as in Embodiment 1, the magnetic recording medium of the present Embodiment shown in FIG. 2 is constituted such that it can be applied to a magnetic recording medium with which the recording and reproduction of recording marks recorded at high density are possible by irradiating with a laser beam from the disk substrate side and detecting recording and reproduction of signals with a magnetic head 102 from the lubricating protective layer 19 side where the recording layer 14 is formed. This constitution in which the recording and reproduction of signals are detected with a magnetic head can be applied to a magnetic recording medium which makes possible recording and reproduction of recording marks smaller than the detection limit of the laser spot during reproduction.

The recording layer 14 of the magnetic recording medium 10 has a magnetic compensation temperature that is close to room temperature, and is specifically set from −100 to 180° C., and preferably, from −60 to 100° C., and even more preferably from −20 to 60° C. The Curie temperature of the recording layer 14 is set between 200 and 400° C., and preferably between 250 and 360° C.

An example of the material of which the recording layer 14 is made is an alloy composed of three metals, namely, terbium, iron, and cobalt. It is commonly known that with a magnetic film composed of an alloy such as this the magnetic compensation temperature varies with the terbium content.

The magnetic film produced in Embodiment 1 has, for example a composition of $Tb_{26}Fe_{57}Co_{17}$ (the numbers indicate the atom percentages), its magnetic compensation temperature is close to 40° C., and its Curie point is at least 300° C. Therefore, if we examine the temperature characteristics of this magnetic recording film, we see that the coercive force decreases as the temperature rises, and in the case of thermal assist, a magnetic head can be used to record with a small magnetic field.

The reproduction layer 15 in the magnetic recording medium 10 is a GdFeCoAl magnetic thin film with a magnetic compensation temperature of 20° C. and a Curie temperature of 280° C.

Because the magnetic compensation temperature of the reproduction layer is set close to room temperature, the saturation magnetization of the reproduction layer increases with the temperature, reaching a maximum near the reproduction temperature from 100 to 220° C., and thereafter decreasing. In this case, reproduction signal output can be further increased near the reproduction temperature because the saturation magnetization increases.

In this embodiment, the saturation magnetization Ms reaches its maximum at 150° C., which is the temperature attained when the light beam irradiates the disk. Another film characteristic is that the coercive force Hc of the recording layer decreases as the temperature rises, and even when tiny magnetic domains are recorded, stable recording magnetic domains can still be formed, and even in repeated recording and reproduction with a magnetic head, recording and reproduction with excellent signal characteristics will be possible.

Thus, with the magnetic recording medium of this embodiment, during the recording of information, the disk is rotated and irradiated with the laser spot along the track while the recording magnetic field is modulated with a magnetic head. Here, the coercive force of the recording layer decreases at higher temperatures, which is why recording with the small magnetic field of a magnetic head is possible. Also, during recording and reproduction, the disk is irradiated with the laser beam and the temperature is raised while the magnetic domains transcribed from the recording layer to the reproducing layer are transcribed to the recording magnetic domains and detected by the GMR head. Here, if the constitution is such that the saturation magnetization Ms of the reproduction layer rises along with the temperature, the reproduction signal will be largest at elevated temperatures, so detection sensitivity with the GMR head is better and there is an increase in the reproduction signals.

An experiment into the recording and reproduction of an information signal to the recording track of the magnetic recording medium 10, which was conducted using the above-mentioned thermally-assisted recording and reproduction device and the magnetic recording medium 10, will be described. The GMR head 102 used here had a width of 0.4 μm in the direction perpendicular to the track, the light spot size was approximately 1.0 μm, and the optical power was 5 mW during recording and 2.5 mW during reproduction. The disk speed was 8000 rpm, and the reference frequency during recording was 400 MHz.

Here, with the method for recording to and reproducing from a magnetic recording medium of the present Embodiment, during recording the laser power of the light source is increased to 5 mW, and the laser pulse is irradiated with duty 30%, so that thermal assist is performed on the magnetic recording medium 10 near the recording-use magnetic head. Here, the temperature distribution gradient is less than steep in the recording region of the magnetic recording medium 10 than during reproduction, and the temperature of the recording region of the magnetic recording medium 10 is 160° C. or higher, so the coercive force is 5 koe or lower. Accordingly, the magnetic head 102 can record with a smaller magnetic field, which facilitates modulation of the magnetic field at high frequencies. Furthermore, the movement of domain walls produced by the temperature gradient during recording has little effect, and the shape of the recording marks does not change, so stable recording is possible.

Also, during signal reproduction, thermal assist is provided by the laser beam source focused on the recording film of the magnetic recording medium, and the peak of the temperature distribution is to the near of the center position of the reproduction-use GMR head. This means that in the region near the GMR head where signal reproduction detection from the magnetic recording medium is performed, the saturation magnetization Ms of the magnetic recording medium reaches almost its maximum, so detection sensitivity with the GMR head is better and the signals can be detected.

Therefore, even when fine magnetic domains are recorded at high density in a thermally-assisted recording and reproduction system, stable recording domains can be formed, and during signal reproduction, the signal will be recorded and reproduced at a good S/N ratio.

Also, during signal reproduction, the temperature outside the read region drops to 100° C. or lower, because the temperature distribution of the magnetic recording medium 10 with thermal assist is to the near of the center position of the reproduction-use GMR head. Accordingly, the temperature outside the read region, such as the adjacent track where the recording layer of the magnetic recording medium 10 is not irradiated with the laser beam is sufficiently remote from the temperature range of 130 to 250° C., which is the temperature reached by the read region of the magnetic film in the magnetic recording medium 10, so the problem of cross talk occurring during reproduction is also prevented.

In addition, when the saturation magnetization near room temperature of the magnetic recording medium 10 is kept low, there will be little effect of the magnetic flux produced by residual magnetization from the magnetic film outside the region where there is no irradiation by the light beam (that is, the read region), so there is a further reduction in cross talk and cross write.

The magnetic recording medium 10 of the present invention is particularly effective when the magnetic recording medium and the head are tightly sealed, as when the magnetic recording and reproduction device is an ordinary hard disk. This is a closed state in which the magnetic recording medium and the head are fixed, so keeping the thermal assist stable affords a more stable effect in recording and reproduction.

As mentioned above, with the constitution of the present embodiment, even when recording and reproducing at high density, the magnetic recording medium and the method for recording to and reproducing from the magnetic recording medium can be achieved, in which stable recording magnetic domains can be formed, reproducing signals with high quality can be detected.

Embodiment 8

An embodiment of the magnetic recording medium of the present invention will now be given.

The magnetic recording medium in this embodiment has the same structural cross section as the magnetic recording medium 10 in Embodiment 1, shown in FIG. 2.

Just as in Embodiment 1, the magnetic recording medium of the present Embodiment shown in FIG. 2 is constituted such that it can be applied to a magnetic recording medium with which the recording and reproduction of recording marks recorded at high density are possible by irradiating with a laser beam from the disk substrate side and detecting recording and reproduction of signals with a magnetic head 102 from the lubricating protective layer 19 side where the recording layer 14 is formed. This constitution in which the recording and reproduction of signals are detected with a magnetic head can be applied to a magnetic recording medium which makes possible recording and reproduction of recording marks smaller than the detection limit of the laser spot during reproduction.

The recording layer 14 of the magnetic recording medium 10 has a magnetic compensation temperature that is close to room temperature, and is specifically set from −100 to 180° C., and preferably, from −60 to 100° C., and even more preferably from −20 to 60° C. The Curie temperature of the recording layer 14 is set between 200 and 400° C., and preferably between 250 and 360° C.

An example of the material of which the recording layer 14 is made is an alloy composed of four metals, namely, terbium, dysprosium, iron, and cobalt. It is commonly known that with a magnetic film composed of an alloy such as this the magnetic compensation temperature varies with the content of terbium and dysprosium.

The magnetic film produced in Embodiment 1 has, for example a composition of $Tb_{18}Dy_7Fe_{58}Co_{17}$ (the numbers indicate the atom percentages), its magnetic compensation temperature is close to −30° C., and its Curie point is at least 290° C. Therefore, if we examine the temperature characteristics of this magnetic recording film, we see that the coercive force decreases as the temperature rises, and in the case of thermal assist, a magnetic head can be used to record with a small magnetic field.

Because the magnetic compensation temperature of the reproduction layer is set close to room temperature, the saturation magnetization of the reproduction layer increases with the temperature, reaching a maximum near the reproduction temperature from 100 to 220° C., and thereafter decreasing. In this case, reproduction signal output can be further increased near the reproduction temperature because the saturation magnetization increases.

In this embodiment, the saturation magnetization Ms reaches its maximum at 150° C., which is the temperature attained when the light beam irradiates the disk. Another film characteristic is that the coercive force Hc of the recording layer decreases as the temperature rises, and even when tiny magnetic domains are recorded, stable recording magnetic domains can still be formed, and even in repeated recording and reproduction with a magnetic head, recording and reproduction with excellent signal characteristics will be possible.

Thus, with the magnetic recording medium of this embodiment, during the recording of information, the disk is rotated and irradiated with the laser spot along the track while the recording magnetic field is modulated with a magnetic head. Here, the coercive force of the recording layer decreases at higher temperatures, which is why recording with the small magnetic field of a magnetic head is possible. Also, during recording and reproduction, the disk is irradiated with the laser beam and the temperature is raised while the magnetic domains transcribed from the recording layer to the reproducing layer are transcribed to the recording magnetic domains and detected by the GMR head. Here, if the constitution is such that the saturation magnetization Ms of the reproduction layer rises along with the temperature, the reproduction signal will be largest at elevated temperatures, so detection sensitivity with the GMR head is better and there is an increase in the reproduction signals.

An experiment into the recording and reproduction of an information signal to the recording track of the magnetic recording medium 10, which was conducted using the above-mentioned thermally-assisted recording and reproduction device and the magnetic recording medium 10, will be described. The GMR head 102 used here had a width of 0.5 µm in the direction perpendicular to the track, the light spot size was approximately 0.8 µm, and the optical power was 5.5 mW during recording and 2.0 mW during reproduction. The disk speed was 7000 rpm, and the reference frequency during recording was 400 MHz.

Here, with the method for recording to and reproducing from a magnetic recording medium of the present Embodiment, during recording the laser power of the light source is increased to 5 mW, and the laser pulse is irradiated with duty 40%, so that thermal assist is performed on the magnetic recording medium 10 near the recording-use magnetic head. Here, the temperature distribution gradient is less than steep in the recording region of the magnetic recording medium 10 than during reproduction, and the temperature of the recording region of the magnetic recording medium 10 is 160° C. or higher, so the coercive force is 4 koe or lower. Accordingly, the magnetic head 102 can record with a smaller magnetic field, which facilitates modulation of the magnetic field at high frequencies. Furthermore, the movement of domain walls produced by the temperature gradient during recording has little effect, and the shape of the recording marks does not change, so stable recording is possible.

Also, during signal reproduction, the laser power of the light source is increased to 2 mW, and the laser pulse is irradiated with duty 50%, so that to reduce broadening the temperature distribution. This means that in the region near the center of the reproduction-use GMR head where signal reproduction detection from the magnetic recording medium is performed, the saturation magnetization Ms of the magnetic recording medium reaches almost its maximum, so detection sensitivity with the GMR head is better and the signals can be detected.

Therefore, even when fine magnetic domains are recorded at high density in a thermally-assisted recording and reproduction system, stable recording domains can be formed, and during signal reproduction, the signal will be recorded and reproduced at a good S/N ratio.

Also, during signal reproduction, because the temperature distribution of the magnetic recording medium 10 with thermal assist is to the near of the center position of the reproduction-use GMR head, broadening the temperature distribution can be reduced. Accordingly, the temperature outside the read region, such as the adjacent track where the recording layer of the magnetic recording medium 10 is not irradiated with the laser beam is sufficiently remote from the temperature range of 130 to 250° C., which is the temperature reached by the read region of the magnetic film in the magnetic recording medium 10, so the problem of cross talk occurring during reproduction is also prevented.

In addition, when the saturation magnetization near room temperature of the magnetic recording medium 10 is kept low, there will be little effect of the magnetic flux produced by residual magnetization from the magnetic film outside the region where there is no irradiation by the light beam (that is, the read region), so there is a further reduction in cross talk and cross write.

The magnetic recording medium 10 of the present invention is particularly effective when the magnetic recording medium and the head are tightly sealed, as when the magnetic recording and reproduction device is an ordinary hard disk. This is a closed state in which the magnetic recording medium and the head are fixed, so keeping the thermal assist stable affords a more stable effect in recording and reproduction.

As mentioned above, with the constitution of the present embodiment, even when recording and reproducing at high density, the magnetic recording medium and the method for recording to and reproducing from the magnetic recording medium can be achieved, in which stable recording magnetic domains can be formed, reproducing signals with high quality can be detected.

Embodiment 9

Next, another embodiment of the magnetic recording medium is described.

Figure 7:
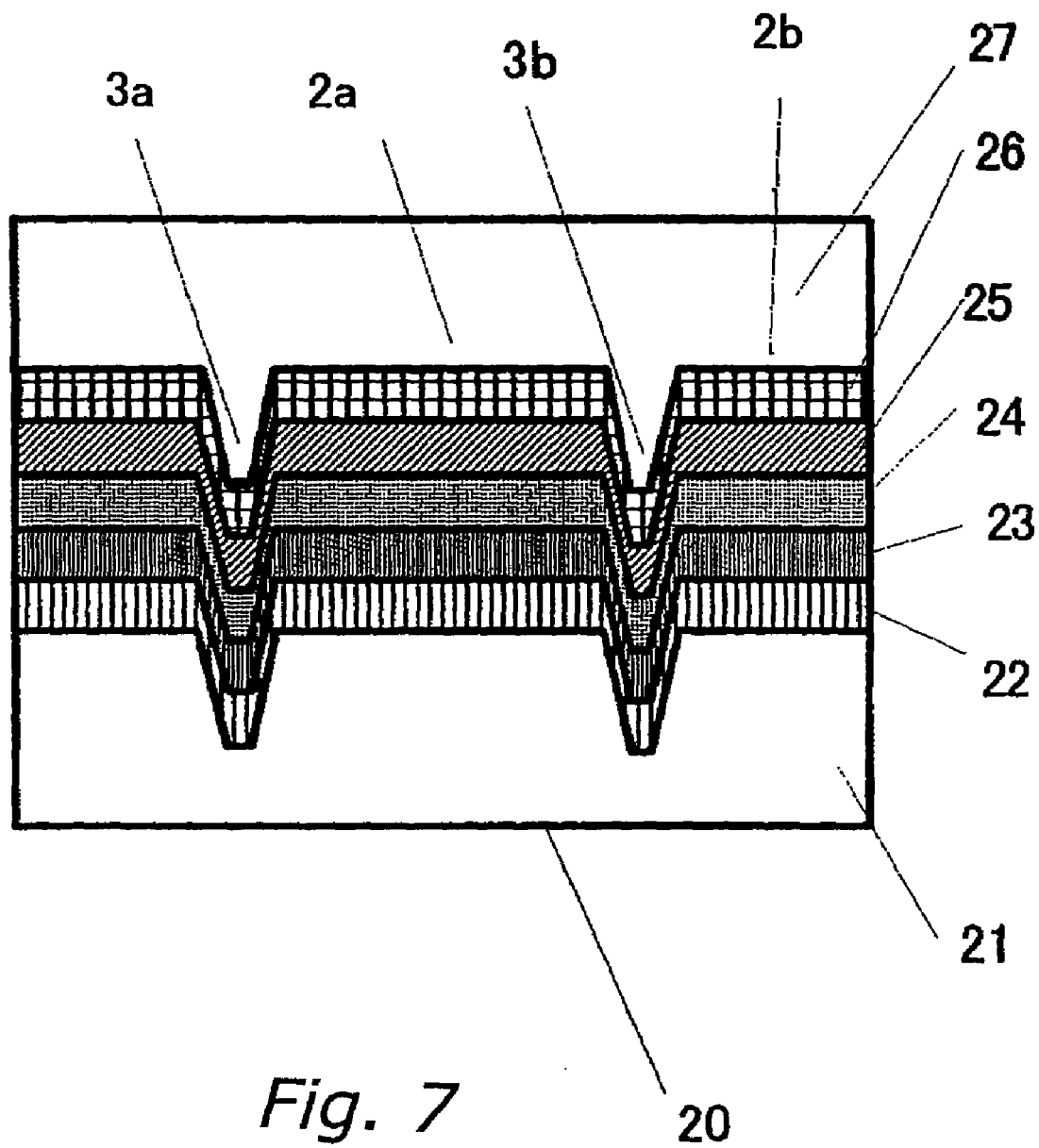
FIG. 7 is a cross section of the structure of the magnetic recording medium in Embodiment 7 of the present invention.

FIG. 7 is a cross section of the structure of a magnetic disk 20 in Embodiment 9 of the present invention. In FIG. 7, there are provided a transparent disk substrate 21 composed of glass, a under dielectric layer 22, and a magnetic recording film (23, 24, and 25). The magnetic recording film is made up of a recording layer 23, an intermediate layer 24, and a reproduction layer 25. A protective layer 26 and a solid lubricating protective layer 27 are further provided for protecting the recording film and sliding a magnetic head.

As shown in the drawing, the disk substrate comprises lands 2a and 2b of the recording tracks, and grooves 3a and 3b formed in between the recording tracks. The groove portion between tracks can be annealed, thereby providing a guard band between recording tracks, changing the magnetic characteristics of the recording film, and allowing domain wall movement by DWDD method to be performed more easily in the recording tracks. Also, when a region has thus been annealed, the coefficient of thermal conductivity of the recording film changes. A constitution such as this results in a temperature profile that changes with the irradiating light used for thermal assist. Thus, even though the same heating is applied, a temperature profile that is varied from a transverse direction of the recording track to a tracking direction can be formed. Moreover, an effect of any stray magnetic field from the annealed area to the recording track can be reduced because the temperature characteristics of the saturation magnetization are also different in the annealed area. Specifically, the thermal conductivity decreases in the region of the guard bands between recording tracks versus that within the recording tracks, and the temperature profile changes when the size of the optically irradiated region is changed.

Therefore, under optical irradiation, the difference in thermal conductivity from one recording track to another changes the curvature of the temperature distribution. Accordingly, during recording, if the power of the laser beam used for thermal assist is set relatively high, a profile with a small curvature of temperature distribution can be formed, so the recording marks will also have small curvature in the radial direction, allowing substantially linear recording marks to be formed. During reproduction, if the optical irradiation region is made smaller than that during recording, the temperature distribution gradient will be large in the direction of movement of the recording and reproduction head, and furthermore the curvature of the temperature distribution can be made small in the radial direction, the domain walls of the magnetic domains transferred from the recording layer to the reproduction layer will more readily move in the direction of disk rotation, and more stable reproduction will be possible.

As discussed above, with the thermally-assisted magnetic recording medium of this embodiment, a guard band is provided between recording tracks, which allows the temperature profile within recording tracks to be changed, and the temperature profile in the recording and reproduction region of the magnetic recording medium can be varied by varying the light source wavelength, the laser beam power, the pulse width, and so forth. As a result, with a recording and reproduction method featuring a GMR head, even when fine magnetic domains are recorded at high density, stable recording domains can be formed, and during signal reproduction, stable DWDD operation can be achieved, which means that the signal will be recorded and reproduced at a good S/N ratio.

The result of the above is that the jitter value of the reproduction signal can be kept to no more than 10% versus the shortest time width of the detected signal, and the uncorrected error rate can be kept to an order of $10^{-5}$ or less, so a magnetic recording medium having excellent recording and reproduction characteristics can be obtained.

As mentioned above, with the constitution of the present embodiment, even when recording and reproducing at high density, the magnetic recording medium and the method for recording to and reproducing from the magnetic recording medium can be achieved, in which stable recording magnetic domains can be formed, reproducing signals with high quality can be detected.

Furthermore, with the method for recording to and reproducing from a magnetic recording medium of this embodiment, the constitution described above was such that when thermal assist is performed by optical irradiation, the temperature distribution gradient is larger during recording than during reproduction, but the constitution may instead be such that the temperature distribution gradient is larger during recording or during reproduction depending on the structure of the magnetic recording medium or on the thermal assist and recording and reproduction method, or light pulses may be emitted at high speed, for example, as long as the method varies the temperature distribution of the magnetic recording medium between recording and reproduction. In other words, this method is fixing the magnetic domain walls by reversing the recording magnetic field at the position where the variation of the coercive force Hc due to the temperature variation is rapid. Or this method can be realized by matching modulation timing of reversing recording magnetic field at the position where the variation of the coercive force Hc due to the temperature variation is rapid. Preferably, the modulation timing at the position is 2.0 ns or less.

In particular, the temperature elevation will be even more effective with a recording and reproduction method in which the timing at which the pulses of irradiating light are emitted is controlled so as to shift the phase with a recording mark edge.

Other Embodiments

With the method for recording to and reproducing from a magnetic recording medium in the above embodiments, thermal assist produced by optical irradiation was described, but the present invention is not limited to this, and a similar effect will be obtained, for example, with a method in which thermal assist is accomplished by a heating method that makes use of thermal conduction or the like, or a method in which the temperature distribution of the magnetic recording medium is different during recording and during reproduction.

Also, the effect will be even better with a method in which the temperature profile during optical irradiation is changed using pulsed light or the like, and the temperature change of the coercive force of the recording layer is utilized to fix the domain walls of the recording magnetic domains.

The effect will be even better with a constitution in which the change of saturated magnetization of the temperature distribution of the recording film is utilized to cancel out any stray magnetic field.

The thermal assist method in the present invention will have a similar effect if it involves controlling the maximum heating temperature of the recording region of the magnetic recording medium to be different during recording and during reproduction.

The magnetic recording medium in the above embodiments is characterized in that the interference layer on the optically irradiated side has an absorption coefficient that varies with the wavelength of the irradiating light, but a thermal absorption layer whose absorption coefficient varies with the wavelength of the irradiating light may instead be provided near the recording layer of the magnetic recording medium. Alternatively, a material whose absorption coefficient varies with the wavelength may be contained in the recording layer.

Also, the constitution of the recording layer in the above embodiments was described as being a multilayer structure featuring magnetically induced super resolution produced by DWDD, but may instead be a constitution having a recording layer in which recording information is stored ahead of time, and including a reproduction layer for increasing the signal quantity of the reproduced information, or a constitution in which two layers are magnetically exchange coupled to each other. Alternatively, even a single layer will have a similar effect, as long as it has a similar function as in these embodiments during recording and reproduction.

Also, a magnetic disk featuring magnetically induced super resolution and a DWDD system was described in this embodiment, and the film structure thereof was described as including a reproduction layer, an intermediate layer, a recording layer, and alternatively also a control layer, but the structure is not limited to this, and may instead be a magnetic recording medium with a film structure featuring magnetically induced super resolution and a RAD, FAD, CAD, or double mask system, or one in which the transferred magnetic domains are expanded and reproduced, such as a MAMMOS system. Furthermore, the structure of the recording film is not limited to a three-layer structure of a recording layer, an intermediate layer and a reproduction layer, and may be a constitution in which a multilayer film having the necessary functions is formed.

Furthermore, a constitution in which the temperature distribution during recording was gentle was described in the above embodiments, but may instead be a recording and reproduction system such as a MAMMOS system, in which, according to the recording and reproduction system, the temperature distribution gradient is steeper during recording, and is more gentle during reproduction.

Furthermore, when a MAMMOS system or the like is used, the reproduction time may be synchronized to the recording information, or reproduction may be performed while magnetic fields are alternated. In this case, an adequate effect will be obtained by using a magnetic recording head to apply a magnetic field that is smaller than the recording magnetic field.

Also, annealing between recording tracks was described for a magnetic recording medium featuring a DWDD system, but the constitution may instead be one that has pits and lands, or grooves whose plane roughness have been modified, or lands to separate the recording tracks. Alternatively, guide grooves may be provided between tracks, and annealing performed. With a constitution such as this, one track in which information is recorded is magnetically isolated from the others, and the recording magnetic domains transferred to the reproduction layer readily undergo domain wall movement, so the resulting magnetic recording medium has even better DWDD signal characteristics. When the recording tracks are thus separated from one another by grooves or lands, tiny magnetic domains of 0.1 µm or smaller can be stably formed, good mobility of the transferred magnetic domain walls can be ensured with DWDD, and a magnetic disk with excellent reproduction signal characteristics can be obtained. Furthermore, cross write and cross talk from adjacent tracks can be reduced during recording and reproduction.

Also, a recording layer composed of TbFeCo was described above, but this may be a magnetic thin film made from an alloy of a rare earth metal and a transition metal, including one or more rare earth metals such as Tb, Gd, Dy, Nd, Ho, Pr, and Er, and a transition metal such as Fe, Co, or Ni.

Furthermore, a reproduction layer of GdFeCoCr was described above, but this may instead be GdFeCoAl or another material composition, or a constitution in which materials of these are used, or a constitution comprising the lamination of multiple layers.

Alternatively, the constitution may be such that Tb and a transition metal (Fe, Co) are laminated in a periodic structure by controlling the rotational speed of the optical disk substrate and the film formation rate during the formation of the TbFeCo recording layer. If the laminar structure in this case is such that the lamination period is at maximum 2.0 nm or less, then it will be possible to increase Ms·Hc, which is the product of the saturation magnetization Ms and the coercive force Hc of the recording layer. Actually, with a recording layer having a 1.0 nm lamination period, a large Ms·Hc of $4.0 \times 10^{-6}$ erg/cm$^3$ can be obtained. Furthermore, with the method for recording and reproducing the medium of the present embodiment, even when tiny magnetic domains of 50 nm or smaller are recorded, stable recording magnetic domains can be formed, and even in repeated recording and reproduction, it will be possible to perform recording and reproduction with excellent signal characteristics.

In addition, the thickness of the recording layer of the medium of the present embodiment is 100 nm, however, the thickness is not limited by the description. When the thickness if 20 nm or more, or more preferably, from 40 nm to 200 nm, a same effect will be obtained.

Also, the Curie temperature of the recording layer composed of TbFeCo was set between 200 and 400° C., more preferably 250 and 360° C., but may be set to any temperature range over 150° C. according to the permissible range of environment temperature, the conditions of temperature elevation by the optical head, and the magnetic head characteristics.

The change in the magnetic characteristics of the magnetic recording medium here are also dependent on changes in the disk substrate or the base layer, and a comparable or better effect will be obtained by adjusting the coercive force, the saturation magnetization, the flux density, the magnetic anisotropy, the temperature characteristics of these, and so forth in the recording layer of the present invention.

The material of the disk substrate described above was glass, or an aluminum alloy metal but other metal materials, plastic materials, crystallized glass or the like may be used instead.

Also, the magnetic disk of the above embodiments was described as having a constitution in which pits were formed by a photopolymer (2P) on the disk substrate surface, or a method such as imprinting was employed, but the pits may instead be worked by directly etching the disk substrate surface, or the pits may be directly worked, or the glass may be melted and the pits transferred. An alternative method is to use imprinting or the like to transfer to a photopolymer. With a disk substrate that utilizes surface roughness, a stamper produced by direct etching of a photoresist base may be used for transfer to the disk substrate, or a base surface formed on the disk substrate may be directly etched.

Another medium or manufacturing method that may be used is to form the recording layer on a disk substrate coated with self-organizing organic fine particles, which allows recording at a high density up to the size of the particle pattern. Further, recording at even higher density will be possible if the particles have uniform characteristics and a small diameter. Alternatively, the shape of self-organizing fine particles may be transferred onto the disk substrate. In particular, the same effect will be obtained when coating with fine particles, etching after transfer, or the like is performed.

Furthermore, on a magnetic recording disk having the width of a track of 0.6 µm or less, in which information is recorded; more preferably having a track pitch of 0.4 µm or less, the recording domains may have a minimum mark length of 0.3 µm for the recorded information may be recorded. The effect will be better when the recording track and the linear recording density are smaller. The effect will be better when the recording track and the linear recording density are bigger.

There are no restrictions on the depth and size of the prepits in this embodiment, but preferably the prepit depth is from 10 to 200 nm, and a comparable or better effect can be obtained with a constitution in which the prepits are as small as possible while still allowing signals from the prepits, such as servo pits or address pits, to be detected with a magnetic head.

The method described in this embodiment involved forming prepits of different surface shape, or prepits by magnetic recording, and detecting the address, but another method that may be used is to detect address information by wobbling grooves or lands. In this case, just one side of the grooves or lands can also be wobbled.

The constitution may also be such that the temperature distribution and thermal conduction within the disk are controlled by forming a thermal absorption layer whose coefficient of thermal conductivity varies with the wavelength of the irradiating light, between the disk substrate and the under dielectric layer.

The base layer was described above for the dielectric layer as being SiN, AlTiN, ZnS—SiO$_2$, TaO, or AgCu on the disk substrate, but it is also possible to use an oxide or nitride of AlTi, AlCr, Cr, Ti, Ta, or another material, or a II-VI or III-V family compound such as a chalcogen compound, or a metal material such as Al, Cu, Ag, Au, or Pt, or a mixed material containing one of these. These materials may also be used as protective film materials.

The method described above was of further forming over the protective layer a solid lubricating layer composed of diamond-like carbon (DLC) by reactive RF sputtering using a carbon target in a mixed atmosphere of argon and CH$_4$, but if a DLC film is formed by CVD or the like, it will be possible to form an even more compact film.

Also, a protective layer of amorphous carbon formed by sputtering was described above, but the present invention is not limited to this, so long as it is a material with a low surface roughness Ra, a small coefficient of friction, and high film strength.

Another method that may be used for the protective layer to overcoat the disk is to apply a film in a uniform thickness of about 5 μm by spin coating using an epoxy acrylate resin or a urethane resin, and cure this coating by irradiation with a UV lamp or with heat.

For a constitution involving forming the lubricating protective layer by coating with perfluoropolyether (PFPE), the material may be diluted with a fluorine-based solvent and a uniform coating applied by using spin coating, dipping, or another such method. The lubricating layer may be a material that is stable on the underlying protective layer.

Also, the magnetic recording medium of the present invention may be further subjected to a step in which tape burnishing to remove any foreign matter, protrusions, or the like without scratching the surface, and afford a smooth coating with a uniform film thickness distribution from the inner periphery to the outer periphery.

Also, the disk substrate may be a double-sided type. In this case, magnetic recording and reproduction are performed under thermal assist from the film side of the recording layer on a magnetic recording medium comprising a recording layer and a protective layer formed on both sides of a disk substrate. With a recording and reproduction device, it is preferable to employ a drive structure in which magnetic heads capable of thermal assist are attached on both sides of the recording film.

Furthermore, after the films are formed on both sides, the medium surface may be placed in a tape burnishing device and subjected to tape burnishing on both rotating sides from the inner periphery toward the outer periphery, so as to remove any foreign matter, protrusions, or the like.

As described above, with the method for recording to and reproducing from a magnetic recording medium of the present invention, magnetic recording and reproduction are performed under thermal assist in the signal recording region of the magnetic recording medium, wherein the temperature profile is different during recording and during reproduction, allowing fine recording magnetic domains to be recorded stably, and making possible a significant increase in recording density without degrading the reproduction signal amplitude. Also, changes in the ambient temperature produce little cross talk, the servo characteristics are stable, and an excellent magnetic recording medium with high reliability, and a recording and reproduction method using the same, can be realized.

According to the present invention, it is possible to provide a magnetic recording medium with which stable recording and reproduction characteristics are obtained and signal characteristics are excellent, even when rewriting is repeatedly performed at high speed and in high density recording, as well as a method for recording to and reproducing from this medium, and a recording and reproduction device for this medium.

Also, the recording and reproduction device for the magnetic recording medium of the present invention comprises a heating unit for raising the temperature of the magnetic recording medium, a magnetic head for the magnetic recording and reproduction of signals to and from the magnetic recording medium, and a control unit for controlling the recording and reproduction of information signals, wherein the control unit performs the recording and reproduction of the information signal while the temperature of the magnetic recording medium is raised by the heating means, and controls the temperature distribution in the signal recording and reproduction region of the magnetic recording medium so as to be different during the recording and during the reproduction of the information signal, allowing fine recording magnetic domains to be recorded stably, and making possible a significant increase in recording density without degrading the reproduction signal amplitude.

Furthermore, changes in the ambient temperature produce little cross talk, the servo characteristics are stable, and an excellent magnetic recording medium with high reliability, and a recording and reproduction method using the same, can be realized.

In addition, the magnetic recording medium of the present invention is a magnetic recording medium for thermally-assisted recording and reproduction in which the recording region is heated by being irradiated with a laser beam, and the recording and reproduction of information are performed magnetically, comprising at least a recording layer and a reproduction layer, wherein the information signal recorded to the recording layer is transferred to the reproduction layer, the transferred magnetic domains are expanded by domain wall movement in the reproduction layer, and a magnetic head is used to perform the recording and reproduction of the signal magnetically in the reproduction layer. The recording layer and/or the reproduction layer of the magnetic recording medium has a constitution in which the absorption coefficient varies with the laser beam wavelength, or if guard bands are provided to the magnetic recording medium, then even if the environment temperature changes, or when the recording film is irradiated with a laser beam during recording and reproduction, the temperature distribution of the recording film of the magnetic recording medium can be easily varied. As a result, fine magnetic domains can be stably recorded to the recording layer, and when the recording film is heated by the light beam or the like and the signal is reproduced using a magnetic head such as a GMR head, a magnetic recording medium with excellent heat resistance and signal characteristics can still be achieved.

Also, changes in the ambient temperature produce little cross talk, the servo characteristics are stable, and an excellent magnetic recording medium with high reliability, and a recording and reproduction method using the same, can be realized. Because of this, it is possible to solve a problem encountered with conventional magnetic recording media, wherein tiny recording magnetic domains degraded as the temperature of the magnetic recording medium rose during irradiation of the recording film with a laser beam. In particular, when the recording film is irradiated with a laser beam, the recording magnetic domains become unstable as the temperature of the magnetic recording medium rises and the temperature changes in the cooling process, and movement of the domain walls results in degradation of the recording domains. Furthermore, when servo pits are formed magnetically, the characteristics of the servo signal also fluctuate, or this is accompanied by a decrease in recording and reproduction characteristics, among other such problems, which are solved [by the present invention].

Therefore, with the magnetic recording medium of the present invention, and the recording and reproduction method in which this is used, it is possible to record fine recording magnetic domains stably with respect to changes in environment temperature or to temperature changes in the magnetic recording medium that occur in the irradiation of the recording film with the laser beam during recording and reproduction. As a result, even when the recording film is heated by the light beam or the like, and a GMR head or other magnetic head is used for signal reproduction, a magnetic recording medium with excellent heat resistance and signal characteristics can still be achieved.

Also, with a constitution in which the temperature profile is different during recording and during reproduction, even when information recorded in a recording region is reproduced by using a head that utilizes a magneto-restrictive effect, residual magnetization outside the heated read region can be suppressed, allowing the reproduction signal to be detected and recording to be performed at high density. Therefore, cross talk from the recording region outside the read region can be suppressed, and the reproduction signal from the recording region of the read region will have a good S/N ratio.

Furthermore, with the thermally-assisted recording and reproduction method of the present invention, when information recorded from the above-mentioned magnetic recording medium is reproduced using a head that utilizes a magneto-restrictive effect, the bias current applied to the head can be varied according to the temperature of the above-mentioned recording region. Therefore, with the above method, deviation in the magnetic compensation temperature produced by variance in the composition of the recording region and so forth can be reduced, and a reproduction signal with a good S/N ratio can be obtained.

With the thermally-assisted recording and reproduction method of the present invention, the jitter value and error rate of the reproduction signal from the recording region can be reduced, adverse effects produced by variance in the circuit, such as the signal level control system, can be suppressed, and a reproduction signal with a good S/N ratio suited to the reproduction conditions can be obtained.

Also, even with a recording medium that performs magnetic recording and reproduction while the temperature of the recording film rises under optical irradiation, servo characteristics will be stable, which enhances reliability and greatly improves disk productivity and cost.

As discussed above, with the constitution of this embodiment, even when recording and reproduction are performed at high density, stable recording domains can be formed, and excellent reproduction signal characteristics can be obtained. Also, because the recording magnetic domains of the information tracks are formed in a stable shape, cross write and cross talk from adjacent tracks can be reduced during recording and reproduction.

INDUSTRIAL APPLICABILITY

The magnetic recording medium of the present invention allows information to be recorded at high density, and is useful and can be applied as an information storage device and a memory medium.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing description of the embodiments according to the present invention are provided for illustration only, and not for the purpose of limiting the invention as defined by the appended claims and their equivalents.

What is claimed is:

1. A method for recording to and reproducing from a magnetic recording medium, the method comprising:

recording and reproducing an information signal while the temperature of the magnetic recording medium is raised by a heating method for raising the temperature of a magnetic recording medium; and controlling the temperature distribution in an information recording and reproduction region of the magnetic recording medium so as to be different during recording and during reproduction of the information signal, wherein the heating method is controlled such that a spot diameter of outgoing light will be different during recording and during reproduction of the information signal.

2. The method for recording to and reproducing from a magnetic recording medium according to claim 1, wherein the heating method is controlled such that the maximum heating temperature will be different during recording and during reproduction of the information signal.

3. The method for recording to and reproducing from a magnetic recording medium according to claim 1, wherein the heating method comprises irradiating the magnetic recording medium with light.

4. The method for recording to and reproducing from a magnetic recording medium according to claim 3, wherein the heating method is controlled such that light sources having different wavelengths will be selected during recording and during reproduction of the information signal.

5. The method for recording to and reproducing from a magnetic recording medium according to claim 3, wherein the heating method is controlled such that light sources having different numerical apertures will be selected during recording and during reproduction of the information signal.

6. The method for recording to and reproducing from a magnetic recording medium according to claim 3, wherein the heating method is controlled such that an exit position of light will be different during recording and during reproduction of the information signal.

7. The method for recording to and reproducing from a magnetic recording medium according to claim 3, wherein the heating method performs irradiation by emitting light from a light source through a waveguide.

8. The method for recording to and reproducing from a magnetic recording medium according to claim 3, wherein the heating method performs irradiation by emitting light from a light source using a recording waveguide during recording of the information signal and a reproduction waveguide during reproduction of the information signal.

9. The method for recording to and reproducing from a magnetic recording medium according to claim 8, wherein the diameter of the recording waveguide is different than the diameter of the reproduction waveguide.

10. The method for recording to and reproducing from a magnetic recording medium according to claim 8, wherein the optical constants of the waveguide material for the recording waveguide are different than the optical constants of the waveguide material for the reproduction waveguide.

11. The method for recording to and reproducing from a magnetic recording medium according to claim 1, wherein the heating method comprises irradiating the magnetic recording medium with pulses of light during recording or reproduction of the information signal.

12. The method for recording to and reproducing from a magnetic recording medium according to claim 11, wherein the width of the light pulses is controlled to be different during recording and during reproduction of the information signal.

13. The method for recording to and reproducing from a magnetic recording medium according to claim 11, wherein the light emission timing is controlled so as to shift the phase with a recording mark edge during the emission of the light pulses.

14. The method for recording to and reproducing from a magnetic recording medium according to claim 1, wherein the linear velocity of the magnetic recording medium is controlled to be different during recording and during reproduction of the information signal.

15. The method for recording to and reproducing from a magnetic recording medium according to claim 2, wherein a temperature distribution gradient produced by the heating method in a recording film is utilized during recording and during reproduction of the information signal.

16. The method for recording to and reproducing from a magnetic recording medium according to claim 15, wherein the center of a magnetic head is within the temperature distribution gradient of the recording film during recording and during reproduction of the information signal.

17. The method for recording to and reproducing from a magnetic recording medium according to claim 16, wherein the temperature distribution gradient of the recording film near the magnetic head is controlled to be greater during the reproduction of the information signal than during the recording of the information signal.

18. The method for recording to and reproducing from a magnetic recording medium according to claim 16, wherein the position of maximum temperature distribution in the recording film is controlled to be different from the position of the magnetic head during reproduction of the information signal.

19. The method for recording to and reproducing from a magnetic recording medium according to claim 16, wherein the position of maximum temperature distribution in the recording film is controlled to be near the position of the magnetic head during recording of the information signal.

20. The method for recording to and reproducing from a magnetic recording medium according to claim 19, wherein the position of maximum temperature distribution in the recording film is controlled during the recording of the information signal so as to be in the center of the magnetic flux generated from the magnetic head.

21. The method for recording to and reproducing from a magnetic recording medium according to claim 15, wherein the temperature distribution gradient near the position of a magnetic recording head during the recording of the information signal is controlled to be less than the temperature distribution gradient near the position of a magnetic reproduction head.

22. The method for recording to and reproducing from a magnetic recording medium according to claim 1, wherein the magnetic recording medium comprises at least a recording layer and a reproduction layer, and the reproduction signal is detected from domain wall movement in the reproduction layer.

* * * * *